(12) United States Patent
Ikeda

(10) Patent No.: US 10,911,645 B2
(45) Date of Patent: Feb. 2, 2021

(54) IMAGE PROCESSING DEVICE, IMAGE PROCESSING METHOD, AND RECORDING MEDIUM

(71) Applicant: NEC Corporation, Tokyo (JP)

(72) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 15/512,340

(22) PCT Filed: Jul. 31, 2015

(86) PCT No.: PCT/JP2015/071750
§ 371 (c)(1),
(2) Date: Mar. 17, 2017

(87) PCT Pub. No.: WO2016/042926
PCT Pub. Date: Mar. 24, 2016

(65) Prior Publication Data
US 2017/0289411 A1  Oct. 5, 2017

(30) Foreign Application Priority Data

Sep. 19, 2014 (JP) .................................. 2014-191480
Dec. 19, 2014 (JP) .................................. 2014-257137

(51) Int. Cl.
*H04N 5/225* (2006.01)
*H04N 5/77* (2006.01)
(Continued)

(52) U.S. Cl.
CPC ............... *H04N 5/225* (2013.01); *G06T 1/00* (2013.01); *G06T 19/00* (2013.01); *G06T 19/006* (2013.01);
(Continued)

(58) Field of Classification Search
CPC combination set(s) only.
See application file for complete search history.

(56) References Cited

U.S. PATENT DOCUMENTS 5,515,079 A     5/1996  Hauck
7,423,658 B1 *  9/2008  Uomori .................. G06T 7/60
                                                        345/660
(Continued)

FOREIGN PATENT DOCUMENTS

JP    2001-209827        8/2001
JP     2001209827   *    8/2001
(Continued)

OTHER PUBLICATIONS

G. Xu et al., "Three-dimensional Vision", Kyoritsu Shuppan, pp. 79-82, 1998.
(Continued)

*Primary Examiner* — Md N Haque
(74) *Attorney, Agent, or Firm* — Finnegan, Henderson, Farabow, Garrett & Dunner, L.L.P.

(57) ABSTRACT

An image processing device (3000) comprises an input unit (3020) and a presentation unit (3040). The input unit (3020) accepts an input of an operation for movement, on a captured image captured by a camera, of a first image which is superimposed on the captured image on the basis of a predetermined camera parameter indicating the position and attitude of the camera and which indicates a target object having a predetermined shape and a predetermined size set in a real space. The presentation unit (3040) presents the first image indicating the target object in a manner of view corresponding to a position on the captured image after the movement on the basis of the camera parameter.

8 Claims, 17 Drawing Sheets

(51) Int. Cl.
  *G08B 25/08* (2006.01)
  *G08B 13/196* (2006.01)
  *G06T 19/00* (2011.01)
  *H04N 5/232* (2006.01)
  *G06T 1/00* (2006.01)
  *H04N 5/76* (2006.01)
  *G06K 9/00* (2006.01)

(52) U.S. Cl.
  CPC ....... *G08B 13/19678* (2013.01); *G08B 25/08* (2013.01); *H04N 5/23293* (2013.01); *H04N 5/76* (2013.01); *H04N 5/77* (2013.01); *G06K 9/00771* (2013.01)

(56) References Cited

U.S. PATENT DOCUMENTS

| | | | |
|---|---|---|---|
| 8,836,768 | B1 | 9/2014 | Rafii et al. |
| 2005/0007385 | A1 | 1/2005 | Aoyama |
| 2007/0127774 | A1 | 6/2007 | Zhang et al. |
| 2009/0022368 | A1* | 1/2009 | Matsuoka ............ B60K 35/00 382/103 |
| 2009/0187863 | A1* | 7/2009 | Kaneshige ........... A63F 13/426 715/850 |
| 2009/0225173 | A1* | 9/2009 | Ogawa ............... G06K 9/00362 348/207.99 |
| 2009/0315978 | A1* | 12/2009 | Wurmlin ............... G06T 5/005 348/43 |
| 2010/0111429 | A1* | 5/2010 | Wang .................. G06T 3/4038 382/233 |
| 2011/0187703 | A1 | 8/2011 | Patwardhan et al. |
| 2012/0114176 | A1 | 5/2012 | Kawano |
| 2013/0128070 | A1* | 5/2013 | Ishikawa ............... H04N 5/232 348/222.1 |
| 2014/0375795 | A1 | 12/2014 | Glimm et al. |

FOREIGN PATENT DOCUMENTS

| | | | |
|---|---|---|---|
| JP | 2005-142938 | | 6/2005 |
| JP | 2005142938 | * | 6/2005 |
| JP | 2013-21733 | | 1/2013 |
| JP | 2013021733 | * | 1/2013 |

OTHER PUBLICATIONS

International Search Report and Written Opinion dated Oct. 27, 2015, in corresponding PCT International Application.
Office Action dated Feb. 3, 2020, by the United States Patent and Trademark Office in counterpart U.S. Appl. No. 16/409,320.
Aliaga et al.; "A Self-Calibrating Method for Photogeometric Acquisition of 3D Objects", IEEE Transactions on Pattern Analysis and Machine Intelligence, vol. 32, No. 4, pp. 1-9, (Apr. 2010).
Japanese Office Action dated Mar. 17, 2020, issued in co-pending Japanese Patent Application No. 2016-548769.
Uno Yusuke et al.; "Silhouette Correction of Virtualized Real Objects Using View-dependent Texture and Geometry for Augmented Reality", The Institute of Electronics, Information and Communication Engineers of Japan (IEICE), Technical Report, vol. 112, No. 385, pp. 223-228, (Jan. 23, 2013).
Ryohei Nagashima et al., "Study of the input method in the touchpad interface to manipulate AR objects", The Virtual Reality Society of Japan, TVRSJ, vol. 19, No. 2, pp. 265-274, (2014).
Office Action dated Jul. 27, 2020, issued by the U.S. Patent and Trademark Office in co-pending U.S. Appl. No. 16/409,320.
Non-final Office Action dated Nov. 12, 2020, issued by the U.S. Patent and Trademark office in co-pending U.S. Appl. No. 16/409,320.

* cited by examiner

IMAGE PROCESSING DEVICE, IMAGE PROCESSING METHOD, AND RECORDING MEDIUM

CROSS-REFERENCE TO RELATED PATENT APPLICATIONS

This application is a National Stage Entry of International Application No. PCT/JP2015/071750, filed Jul. 31, 2015, which claims priority from Japanese Patent Application No. 2014-191480, filed Sep. 19, 2014 and JP 2014-257137, filed Dec. 19, 2014. The entire contents of the above-referenced applications are expressly incorporated herein by reference.

TECHNICAL FIELD

The present invention relates to an image processing technique.

BACKGROUND ART

As one method for monitoring facilities and the like, there is a method that uses a video of a monitoring camera installed in the facilities and the like. An actual size and position of a person or object appearing in a video of the monitoring camera may be calculated using information (hereinafter, referred to as camera parameters) on a position and attitude (posture) of the camera and a size and position on an image of the person or object appearing in the video (image). Through such calculation, it is possible to grasp, when, for example, an important person (a criminal of a case or the like) is appearing in a video of a monitoring camera, a height and the like of the person using the video of the monitoring camera.

Camera parameters used in the above-described purpose and the like are estimated, for example, by calibration. NPL 1 discloses a method in which a calibration pattern is image-captured by a camera and camera parameters (a rotation and translation of the camera) indicating a position and attitude of the camera are estimated from an association relation between three-dimensional coordinates of the calibration pattern in a real world and two-dimensional coordinates of the calibration pattern of the captured image.

Further, there is a case in which already-estimated camera parameters are acquired and used. For example, camera parameters previously calculated by executing calibration for a camera having been a past target may be acquired, or camera parameters defined on the basis of information such as a position and attitude upon installation of the camera may be acquired.

CITATION LIST

Non Patent Literature

NPL 1: Gang Xu and Saburo Tsuji, "Three-dimensional Vision", Kyoritsu Shuppan, pp. 79-82, 1998

SUMMARY OF INVENTION

Technical Problem

It is difficult for camera parameters to always appropriately indicate a position and attitude or the like of a camera that is a target. For example, in a method for calculating camera parameters by calibration, due to a cause such as an input error of a corresponding point, lens distortion, and the like, camera parameters indicating a position and attitude different from an actual position and attitude of a camera may be calculated. Further, also when an already-estimated cameral parameter is acquired, it is difficult to understand whether the camera parameters are appropriate. It is possible that, for example, with an elapsed time, a position and attitude of a camera may change, and therefore camera parameters estimated in the past and a current position and attitude of the camera may differ from each other.

When the camera parameters do not appropriately indicate a position and attitude or the like of a camera that is a target, a problem that an error in a calculation result occurs upon calculating, for example, a height of an important person appearing in a video of the above-described monitoring camera is produced.

In view of the above-described problem, an object of the present invention has been achieved. The object of the present invention is to provide a technique enabling a use to easily confirm whether camera parameters are appropriate.

Solution to Problem

A first image processing device provided by the present invention includes: an input means configured to accept inputting of an operation for movement, on a captured image captured by a camera, to a first image that is superimposed on the captured image on the basis of predetermined camera parameters indicating a position and attitude of the camera and indicates a target object having a predetermined shape and a predetermined size set on a real space; and a presentation means configured to present the first image indicating the target object in a manner of view relating to a position on the captured image after the movement on the basis of the camera parameters.

A second image processing device provided by the present invention includes: a display means configured to display a captured image captured by a camera; a parameter acquisition means configured to acquire a cameral parameter indicates a position and an attitude of the camera; an input means configured to accept designation of a first position in the captured image; and a presentation means configured to, based on the camera parameters, a predetermined shape and a predetermined size on the real space of the target object, and the second position on the real space relating to the first position, present a first image indicating a target object on the captured image appearing in a camera defined by the camera parameters upon disposing the target object in a second position in the captured image relating to the first position.

A third image processing device provided by the present invention includes: a first display means configured to display a captured image captured by a camera; a parameter acquisition means configured to acquire a cameral parameter indicates a position and an attitude of the camera; an input means configured to accept inputting of a dot or a line relating to the captured image; and a second display means configured to display the first image indicating the dot or a line mapped on a plane representing a ground surface is viewed from a direction vertical to the plane, based on the camera parameter, a position of the dot or the line on the captured image.

A first image processing method provided by the present invention includes: an input step of accepting inputting of an operation for movement, on a captured image captured by a camera, to a first image that is superimposed on the captured image on the basis of predetermined camera parameters indicating a position and attitude of the camera and indicates a target object having a predetermined shape and a predetermined size set on a real space; and a presentation step of presenting the first image indicating the target object in a manner of view relating to a position on the captured image after the movement on the basis of the camera parameters.

A second image processing method provided by the present invention includes: a display step of displaying a captured image captured by a camera; a parameter acquisition step of acquiring a cameral parameter indicating a position and an attitude of the camera; an input step of accepting designation of a first position in the captured image; and a presentation step of, based on the camera parameters, a predetermined shape and a predetermined size on the real space of the target object, and the second position on the real space relating to the first position, presenting a first image indicating a target object on the captured image appearing in a camera defined by the camera parameters upon disposing the target object in a second position in the captured image relating to the first position.

A third image processing method provided by the present invention includes: a first display step of displaying a captured image captured by a camera; a parameter acquisition step of acquiring a cameral parameter indicates a position and an attitude of the camera; an input step of accepting inputting of a dot or a line relating to the captured image; and a second display step of displaying the first image indicating the dot or a line mapped on a plane representing a ground surface is viewed from a direction vertical to the plane, based on the camera parameter, a position of the dot or the line on the captured image.

A program provided by the present invention cause a computer to operate as the first image processing device, the second image processing device, or the third image processing device.

Advantageous Effects of Invention

According to the present invention, a technique enabling the user to easily confirm whether camera parameters are appropriate is provided.

BRIEF DESCRIPTION OF DRAWINGS

The above-described object and other objects as well as features and advantages will become further apparent from the following description of preferred example embodiments and the following accompanying drawings.

DESCRIPTION OF EMBODIMENTS

Hereinafter, example embodiments of the present invention will be described using the accompanying drawings. In all the drawings, the same components are assigned with the same reference signs, and description thereof will be omitted, as appropriate.

First Example Embodiment

Figure 1:
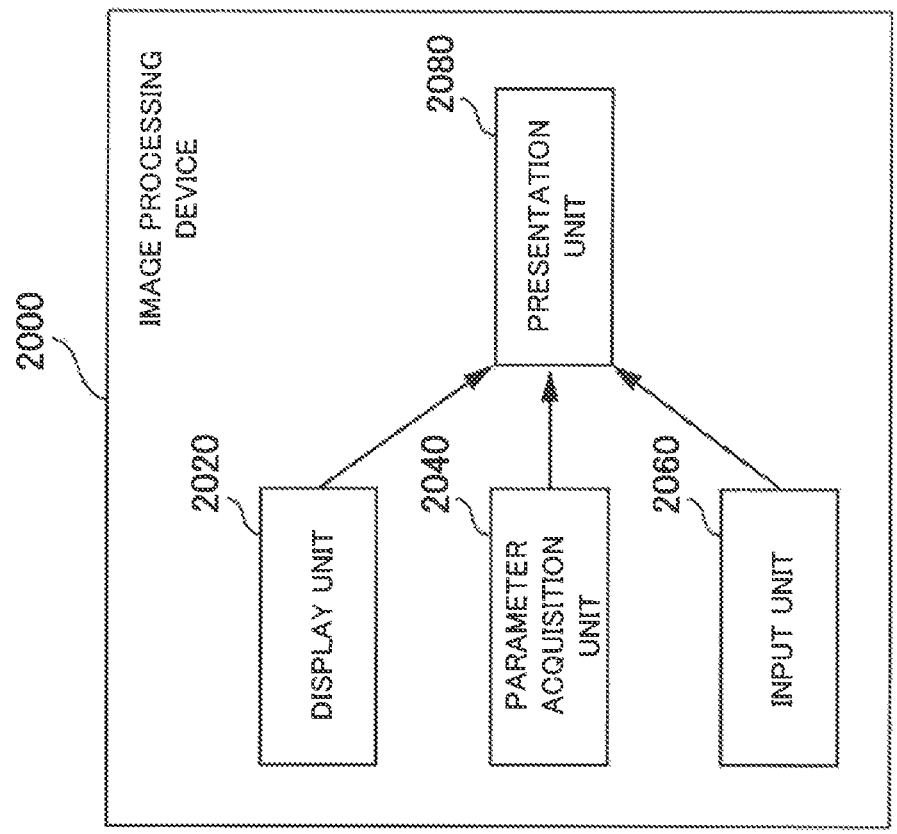
FIG. 1 is a block diagram illustrating an image processing device according to a first example embodiment.

FIG. 1 is a block diagram illustrating an image processing device 2000 according to a first example embodiment. In FIG. 1, an arrow indicates a flow of information. Further, in FIG. 1, each block does not represent a configuration of a hardware unit but represents a configuration of a function unit.

The image processing device 2000 includes a display unit 2020, a parameter acquisition unit 2040, an input unit 2060, and a presentation unit 2080.

The display unit 2020 displays a captured image captured by a camera. The parameter acquisition unit 2040 acquires camera parameters indicating a position and attitude or the like of the camera. The camera parameters may include a parameter other than the position and attitude of the camera. The parameter other than the position and attitude of the camera will be described later.

The input unit 2060 accepts a designation of a first position on a captured image. The presentation unit 2080 generates a first image indicating a target object on the captured image appearing in a camera defined by the camera parameters upon disposing the target object in a second position on a real space relating to the first position. In other words, the first image is an image indicating how the target object looks when viewed from a point of view of the camera defined by the camera parameters. Further, it is possible to determine the second position on the real space from the camera parameters and height information of the first position and the second position. "Disposing a target object in a second position" means that it is assumed that the target object exists in a position (the second position) on a real space relating to the first position on the captured image. The presentation unit 2080 generates the first image using the camera parameters, a predetermined shape and a predetermined size on the real space of the target object, and the second position. Further, the presentation unit 2080 presents the generated first image in the first position on the captured image. The target object is a virtual object having a planar shape or a solid shape. The predetermined size and the predetermined shape set for the target object are a size and a shape in which a real world is assumed. The predetermined size and the predetermined shape may be input by the user or may be previously stored in the inside or the outside of the image processing device 2000.

Figure 2A:
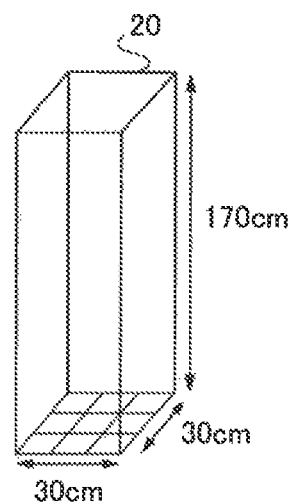
FIG. 2A is a diagram illustrating a situation where an image processing device has presented a predetermined object on a captured image.
Figure 2B:
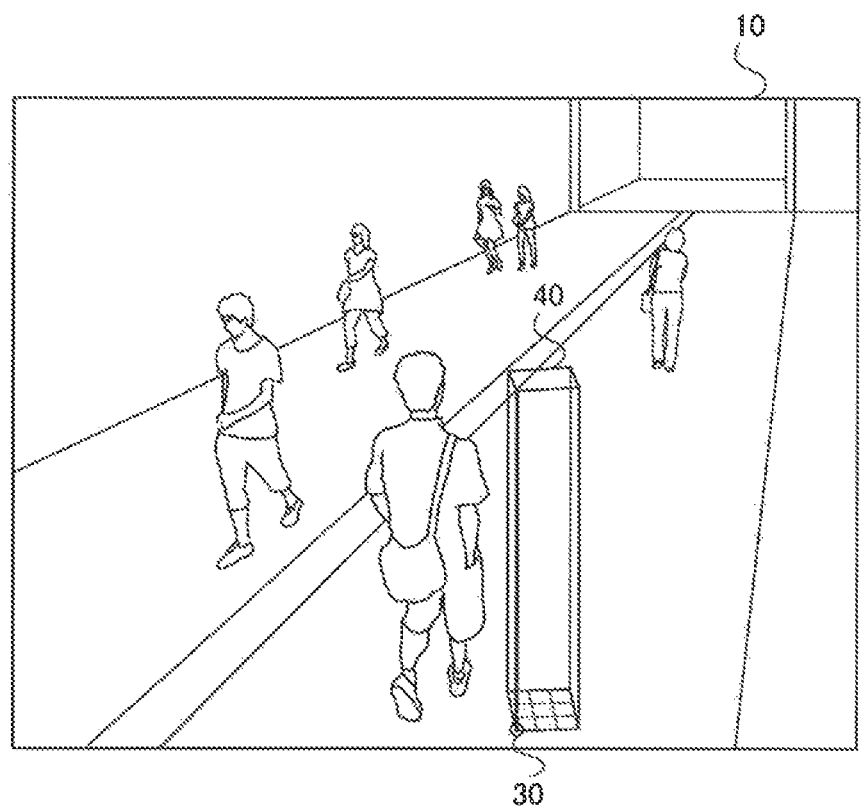
FIG. 2B is a diagram illustrating a situation where an image processing device has presented a predetermined object on a captured image.

Using FIGS. 2A and 2B, specific description will be made. FIGS. 2A and 2B show a diagram illustrating a situation where the image processing device 2000 has presented a predetermined object on a captured image. In FIGS. 2A and 2B, the predetermined object is a rectangular parallelepiped 20. FIG. 2A illustrates a situation where the rectangular parallelepiped 20 is viewed at an appropriate angle. As illustrated in FIG. 2A, a size of the rectangular parallelepiped 20 is 30 cm in width and depth and 170 cm in height. The rectangular parallelepiped 20 in this example is an object in which a shape and size of an average person are simplified.

FIG. 2B is a diagram in which the image processing device 2000 has presented the rectangular parallelepiped 20 on a captured image 10. A first position 30 indicates a first position input to the input unit 2060. The presentation unit 2080 presents a first image 40 in the first position 30. The first image 40 is an image indicating in a pseudo manner, when the rectangular parallelepiped 20 disposed in a position equivalent to the first position 30 in a real world is image-captured by a camera specified by camera parameters, the rectangular parallelepiped 20 appearing in the camera.

<Flow of Processing>

Figure 3:
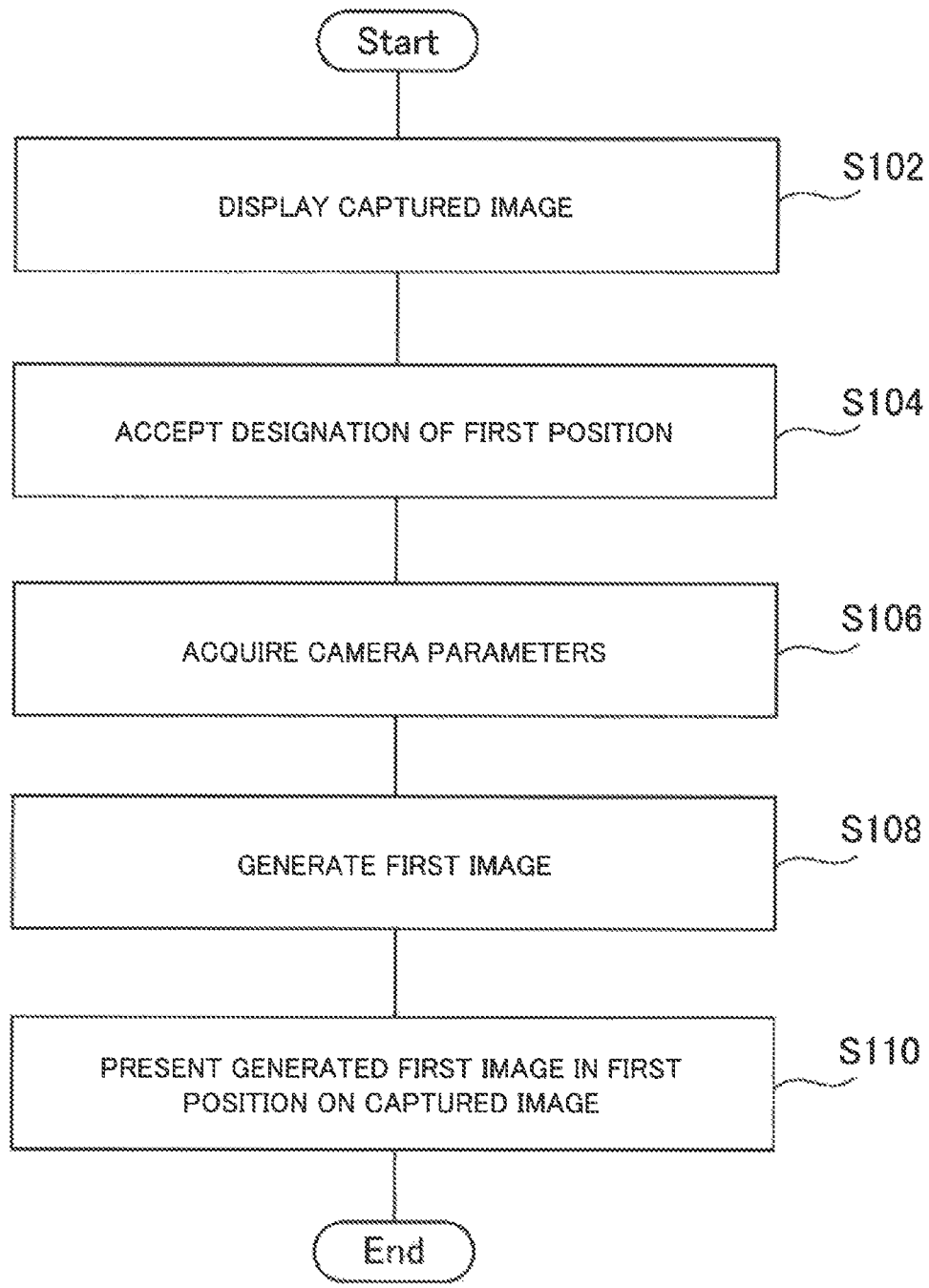
FIG. 3 is a flowchart illustrating a flow of processing executed by the image processing device of the first example embodiment.

FIG. 3 is a flowchart illustrating a flow of processing executed by the image processing device 2000 of the first example embodiment. In step S102, the display unit 2020 displays a captured image captured by a camera. In step S104, the input unit 2060 accepts a designation of a first position on the captured image. In step S106, the parameter acquisition unit 2040 acquires camera parameters indicating a position and attitude or the like of the camera. In step S108, the presentation unit 2080 generates a first image. As described above, the first image indicates a target object on a captured image upon appearing in a camera specified by the camera parameters when being disposed in a second position. In step S110, the presentation unit 2080 presents the generated first image in the first position on the captured image.

The flow of processing illustrated in FIG. 3 is one example, and a flow of processing executed by the image processing device 2000 is not limited to the flow illustrated in FIG. 3. For example, processing (step S106) of acquiring camera parameters may be executed before processing (step S104) of accepting inputting of a first position.

<Operations and Advantageous Effects>

According to the present example embodiment, the user of the image processing device 2000 views an object presented by the presentation unit 2080, and thereby the user can easily confirm whether camera parameters appropriately indicate a position and attitude or the like of a camera (hereinafter, a real camera) having captured a captured image displayed by the display unit 2020. Hereinafter, using FIG. 4, detailed description will be made.

Figure 4A:
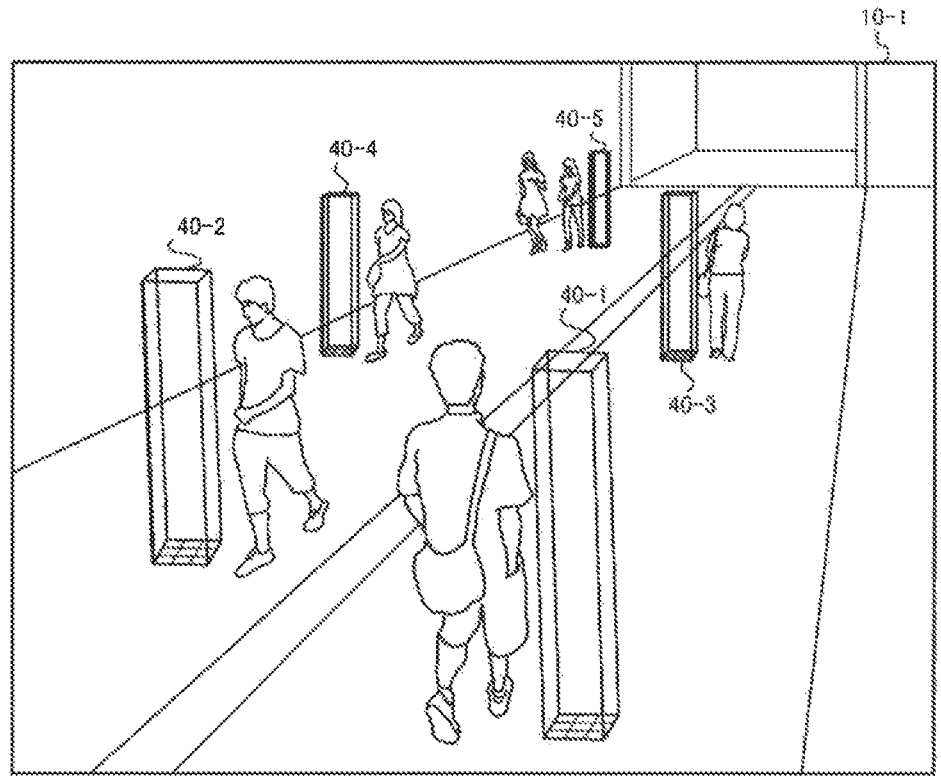
FIG. 4A is a diagram illustrating a captured image in which a first image has been presented by a presentation unit.
Figure 4B:
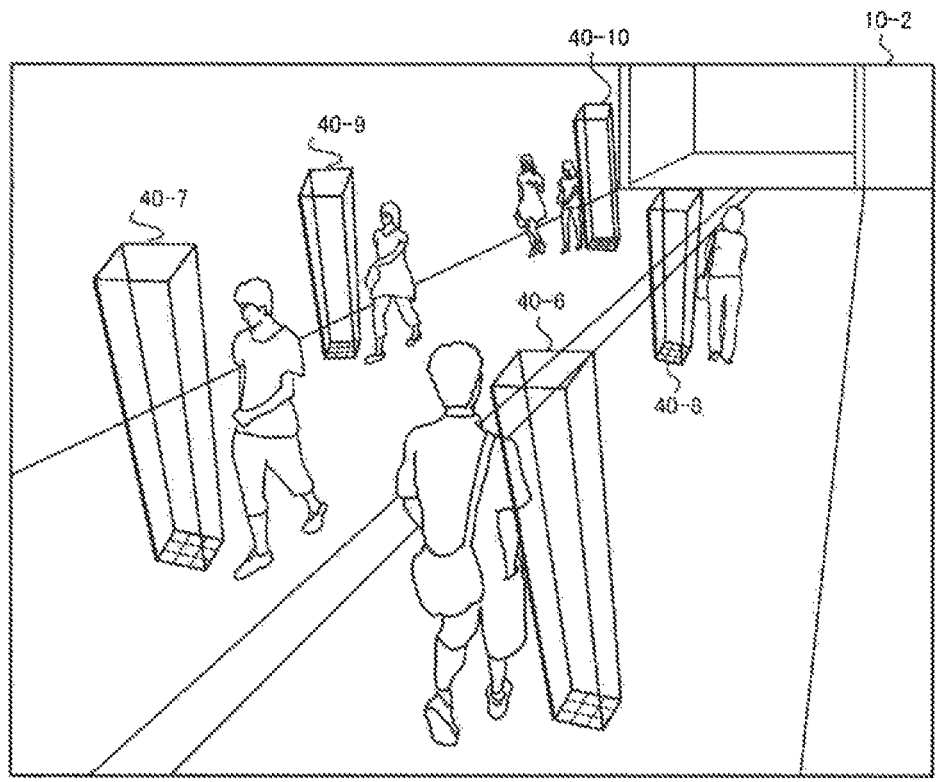
FIG. 4B is a diagram illustrating a captured image in which a first image has been presented by a presentation unit.

FIGS. 4A and 4B show a diagram illustrating a captured image in which a first image has been presented by the presentation unit 2080. FIG. 4A is a diagram in which camera parameters acquired by the parameter acquisition unit 2040 indicate a position and attitude approximate to a position and attitude of a real camera. On the other hand, FIG. 4B is a diagram in which camera parameters acquired by the parameter acquisition unit 2040 indicate a position and attitude different from a position and attitude of a real camera. A target object in FIGS. 4A and 4B show a rectangular parallelepiped having a height of 170 cm and depth and width of 30 cm in the same manner as in the case of FIGS. 2A and 2B.

The first image presented by the presentation unit 2080 is presented on a captured image as if a target object disposed in a place appearing on a captured image has been image-captured by a camera installed in a position and attitude indicated by camera parameters. Therefore, when the camera parameters indicate a position and attitude approximate to a position and attitude of a real camera, there is no feeling of strangeness in a manner of view or the like depending on a size and angle when a person, an object, or the like appearing on the captured image and the first image are compared. A height of the target object is, for example, 170 cm, and therefore when the target object and a person are compared, it is conceivable that heights to substantially the same extent are obtained.

In FIGS. 4A and 4B, a transverse side of a person appearing on the captured image 10 is designated as a first position, and therefore the first image 40 is presented in a transverse side of the person. In FIG. 4A, in any position, sizes of a person and a rectangular parallelepiped indicated by the first image 40 are substantially the same, resulting in no feeling of strangeness. Further, in FIG. 4A, in the same manner as in a case where a person, a wall, and the like appear by being looked down from a front-diagonally upward side, a rectangular parallelepiped indicated by each first image 40 is also looked down from a front-diagonally upward side, and therefore there is no feeling of strangeness also in a manner of view depending on an angle of each rectangular parallelepiped.

In contrast, in FIG. 4B, there is a feeling of strangeness in a manner of view caused by a size and angle of a rectangular parallelepiped indicated by the first image 40. For example, a height of a rectangular parallelepiped indicated by a first image 40-10 is approximately twice a height of a person, and therefore it is difficult to say that the first image 40-10 indicates an object (the rectangular parallelepiped 20) having a height of 170 cm disposed in a place appearing on a captured image 10-2. Further, differently from a rectangular parallelepiped indicated by each first image 40 presented by a captured image 10-1, in the captured image 10-2, a top surface of every rectangular parallelepiped is visible and appears in a manner of view so as to be looked down from a close proximity. In this manner, from a size and angle of each rectangular parallelepiped indicated by the first image 40, it is predictable that a depression angle of a sight line direction of a camera indicated by camera parameters in FIG. 4B has come to be larger than a depression angle of a sight line direction of a real camera.

As illustrated in FIGS. 4A and 4B, the user may designate a plurality of first positions and dispose a plurality of target objects within one captured image.

As described above, according to the image processing device 2000 of the present example embodiment, the user using the image processing device 2000 compares a first image presented by the presentation unit 2080 and a captured image and thereby can easily grasp whether camera parameters acquired by the parameter acquisition unit 2040 indicate a position and attitude approximate to a position and attitude of a camera having captured the captured image. When it is possible to confirm that a position and attitude approximate to a position and attitude of a camera having captured a captured image are indicated, the user can determine that a combination between the camera parameters and a video of a monitoring camera is usable. Conversely, when it is possible to confirm that a position and attitude approximate to a position and attitude of a camera having captured a captured image are not indicated, countermeasures such that camera parameters are estimated again and a position and attitude of a real camera are corrected may be taken.

Hereinafter, the image processing device 2000 of the present example embodiment will be described in more detail.

<Hardware Configuration Example>

Each function configuration unit of the image processing device 2000 may be realized by a hardware component (e.g. a hard-wired electronic circuit) that realizes each function configuration unit or may be realized by a combination between a hardware component and a software component (e.g. a combination between an electronic circuit and a program that controls the circuit).

Figure 5:
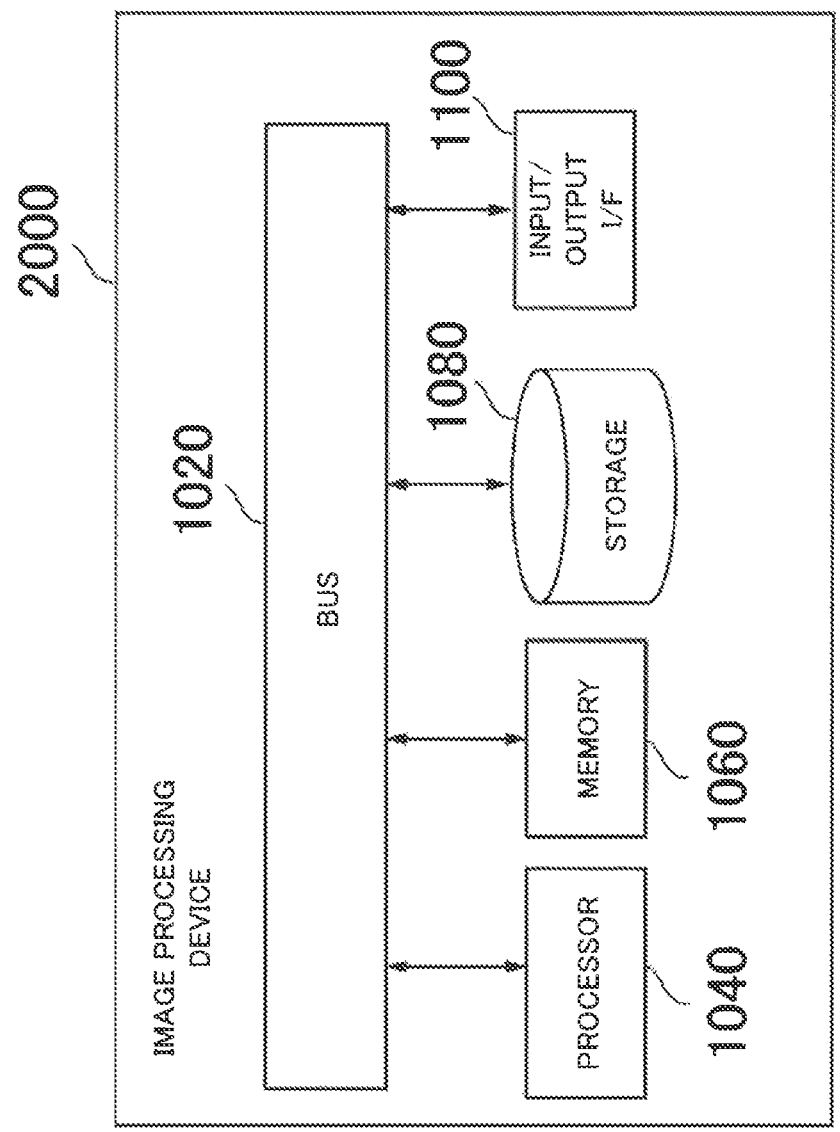
FIG. 5 is a block diagram illustrating a hardware configuration of an image processing device.

FIG. 5 is a block diagram illustrating a hardware configuration of the image processing device 2000. The image processing device 2000 includes a bus 1020, a processor 1040, a memory 1060, a storage 1080, and an input/output interface 1100. The bus 1020 is a data transmission channel in order for the processor 1040, the memory 1060, the storage 1080, and the input/output interface 1100 to mutually execute data transmission/reception. However, a method for mutually connecting the processor 1040 and the like is not limited to bus connection. The processor 1040 is an arithmetic processing unit such as a CPU (Central Processing Unit), a GPU (Graphics Processing Unit), or the like, for example. The memory 1060 is a memory such as a RAM (Random Access Memory), a ROM (Read Only Memory), or the like, for example. The storage 1080 is a storage device such as a hard disk, an SSD (Solid State Drive), a memory card, or the like, for example. Further, the storage 1080 may be a memory such as a RAM, a ROM, or the like. The input/output interface 1100 is an input/output interface in order for the image processing device 2000 to transmit/receive data between itself and an input device, an external device, or the like. The image processing device 2000 acquires, for example, the captured image and the first position via the input/output interface 1100. Further, the image processing device 2000 outputs, for example, a captured image presenting a first image via the input/output interface.

The storage 1080 stores a program for realizing a function of the image processing device 2000. Specifically, the storage stores program modules for realizing functions of the display unit 2020, the parameter acquisition unit 2040, the input unit 2060, and the presentation unit 2080, respectively. The processor 1040 executes these program modules and thereby realizes the functions of the display unit 2020, the parameter acquisition unit 2040, the input unit 2060, and the presentation unit 2080, respectively. When executing the modules, the processor 1040 may read the modules onto the memory 1060 and execute the modules or may execute the modules without being read onto the memory 1060.

The hardware configuration of the image processing device 2000 is not limited to the configuration illustrated in FIG. 5. For example, each program module may be stored on the memory 1060. In this case, the image processing device 2000 may not include the storage 1080.

<Details of Camera Parameters>

As described above, camera parameters may include a parameter other than a position and attitude of a camera. The camera parameters include, for example, an internal parameter indicating an internal characteristic of a camera such as a focal length, lens distortion, coordinates of a center of an image, and the like. The position and attitude of a camera is an external parameter indicating an external characteristic of the camera. The camera parameters may be calculated by associating two-dimensional coordinates on a captured image with three-dimensional coordinates on a real space.

When camera parameters are used, mutual transformation between the two-dimensional coordinates on the captured image and the three-dimensional coordinates on a real space may be made. However, it is difficult that the two-dimensional coordinates on the captured image uniquely determines, by itself, the three-dimensional coordinates on the real space relating to the two-dimensional coordinates. To uniquely determine the three-dimensional coordinates on the real space relating to the two-dimensional coordinates on the captured image, it is necessary to specify, for example, any one of an x-coordinate, a y-coordinate, and a z-coordinate of the three-dimensional coordinates. The image processing device 2000 of the present example embodiment specifies height information (the z-coordinate) of the second position on the real space and thereby uniquely determines the second position on the real space relating to the first position on the captured image. In the present example embodiment, an origin on the real space is set on a ground surface immediately below a camera, the x-coordinate and the y-coordinate are set in a width direction and a depth direction parallel to the ground surface, respectively, and the z-coordinate is set in a direction vertical to the ground surface to make description. A technique for executing mutual transformation between coordinates on an image and coordinates on a real space using camera parameters is a known technique and is described in, for example, NPL 1. Therefore, further detailed description on this technique will be omitted.

There are various methods in which the parameter acquisition unit 2040 acquires camera parameters. The parameter acquisition unit 2040 receives, for example, camera parameters transmitted from an external device. Further, the parameter acquisition unit 2040 accepts, for example, manual inputting of camera parameters. Further, the parameter acquisition unit 2040 reads, for example, camera parameters from a storage device storing camera parameters.

<Details of Display Unit 2020>

The display unit 2020 displays a captured image on a display screen such as a display and the like. The display screen may be a stationary display or may be a portable display included in a mobile terminal and the like.

<Details of Input Method of First Position>

The input unit 2060 may accept a designation of a first position using various methods capable of specifying a position on a captured image. The input unit 2060 accepts, for example, an operation (a click operation or the like) for designating any position on a captured image by an input device such as a mouse and the like. Further, when a captured image is displayed on a touch panel, the input unit 2060 accepts touch inputting or the like for any position on the captured image. Further, the input unit 2060 may accept inputting of coordinates indicating a position on a captured image.

<Details of Target Object>

A target object is an object having, for example, a predetermined size and shape on a real space. Information defining a predetermined target object that is, for example, "a rectangular parallelepiped having a height of 170 cm and depth and width of 30 cm" as described above is previously stored in the inside or outside of the image processing device 2000. In this case, the presentation unit 2080 uses this predetermined handling object.

Further, the image processing device 2000 may include a function for accepting inputting of information defining a target object. In this case, the device may accept information indicating both a shape and a size on a real space of the target object or may accept information indicating only any one of the shape and the size. In the latter case, the shape of the target object is previously determined as a shape of a rectangular parallelepiped, for example, and a designation of the size (depth and width and a height) is accepted from the user.

The shape of the target object is not limited to a rectangular parallelepiped. The target object may be, for example, conical or spherical. Further, the target object may be an object indicating a shape of a person, an animal, or the like such as an avatar and the like.

Figure 6:
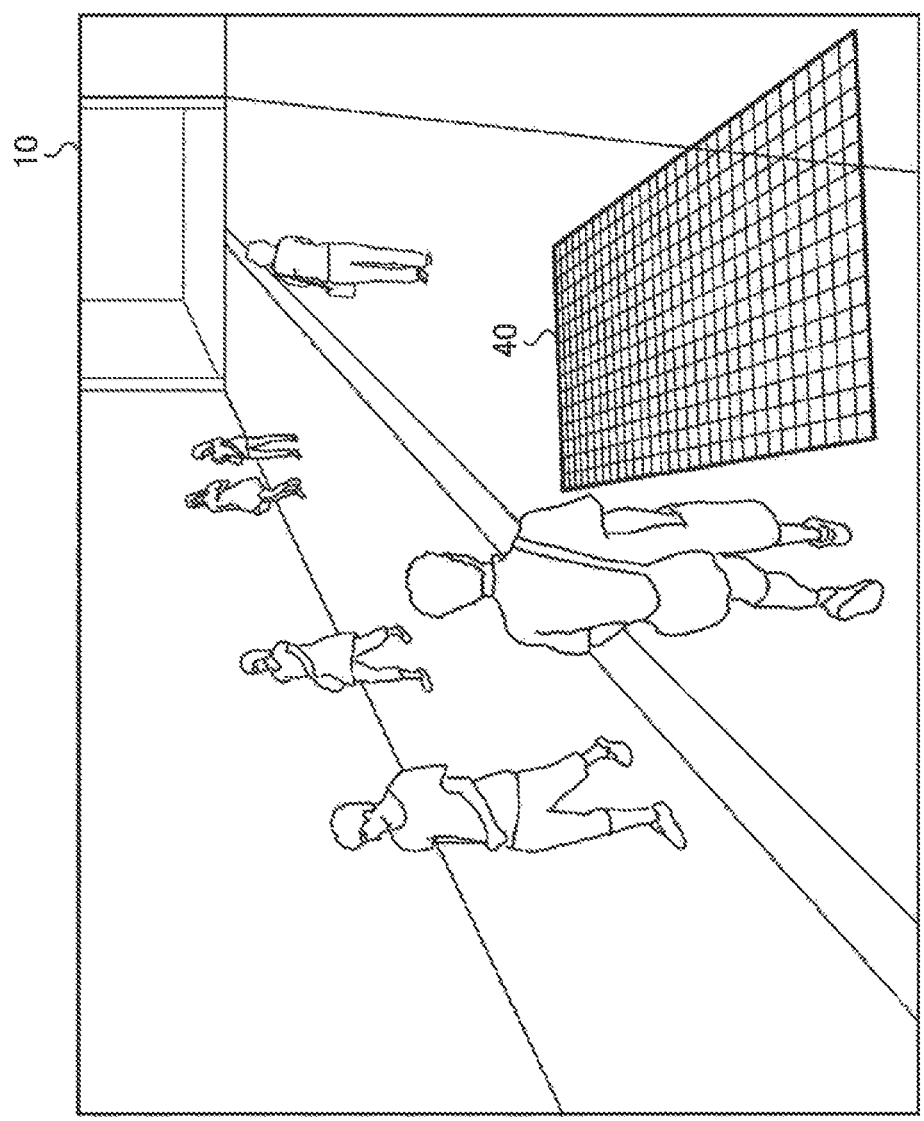
FIG. 6 is a diagram illustrating a situation where a first image indicating a target object of a planar shape is presented on a captured image.

Further, the target object may have a planar shape. FIG. 6 is a diagram illustrating a situation where a first image 40 indicating a target object of a planar shape is presented on a captured image 10. In this case, the user designates, for example, depth and width of a plane. When camera parameters appropriately indicate a position and attitude or the like of a real camera, a first image presented by the presentation unit 2080 becomes parallel to a ground surface. The user compares the first image 40 presented by the presentation unit 2080 with the ground surface appearing on the captured image 10 and checks whether a plane represented by the first image 40 is parallel to the ground surface, and thereby may easily confirm whether the camera parameters appropriately indicate the position and attitude or the like of the real camera. Further, the size of the plane is designated, and therefore, when an object or the like of a known size appearing within a captured image is compared with an appearance and a size on an image and a feeling of strangeness is confirmed, it is possible to easily confirm whether the camera parameters appropriately indicate a position and attitude or the like of the real camera.

<Details of Presentation Unit 2080>

As described above, the presentation unit 2080 generates, when a target object disposed in a second position appears in a camera determined by the camera parameters, an image indicating the target object on a captured image. The presentation unit 2080 executes, for example, the following processing.

First, the presentation unit 2080 calculates a second position on a real space relating to a first position on a target image. As described above, it is difficult that a first position (two-dimensional coordinates) on a target image uniquely determines, by itself, a second position (three-dimensional coordinates) on a real space relating to the first position. Therefore, the presentation unit 2080 acquires information (a z-coordinate of the second position) indicating a height of the second position. The height information of the second position indicates, for example, a height (z=0) of a ground surface on the real space. When the height information of the second position is specified in this manner, a position on the real space relating to the first position on the target image is uniquely determined. The presentation unit 2080 calculates three-dimensional coordinates of the second position using two-dimensional coordinates of the first position, the height information of the second position, and camera parameters. As described above, when these pieces of information are used, two-dimensional coordinates on a captured image can be transformed to three-dimensional coordinates on a real space. The height information of the second position can be previously provided for the presentation unit 2080 or can be supplied from the outside. Alternatively, the height information of the second position may be set as a different height for each of a plurality of areas within a target image.

The presentation unit 2080 generates a first image indicating a target object to be presented on the captured image. When the target object has, for example, a shape of a rectangular parallelepiped or a cone, the presentation unit 2080 calculates coordinates of each apex of the target object to be presented on the captured image to generate the first image. Specifically, the presentation unit 2080 transforms three-dimensional coordinates of each apex in which the target object is disposed in the second position on the real space to two-dimensional coordinates of each apex on the captured image, using the camera parameters. The presentation unit 2080 generates the first image by connecting each apex with a straight line or the like.

An angle of the target object disposed in the real space is optional. The presentation unit 2080 assumes that the target object has been disposed in the second position such that, for example, in an xyz space representing the real space, a width-direction side of the target object is parallel to the x-axis, a depth-direction side thereof is parallel to the y-axis, and a height-direction side thereof is parallel to the z-axis. Directions of these sides may be previously determined, or designations therefor by the user may be accepted. When, for example, in the captured image 10 of FIG. 6, a target object of a planar shape is used, a depth-direction side is matched with a line on a ground surface, and thereby it becomes possible to easily determine whether the target object and the ground surface are parallel to each other. In addition thereto, when, for example, a lattice of a predetermined width on a real space is drawn in a target object, a depth-direction side of the target object is matched with a line or the like of a tile having a known size of a floor face, and thereby a size of the tile may be measured. The size is confirmed, and thereby determination is more easily performed. Therefore, the image processing device 2000, for example, enables the user to rotate a target object being presented on the captured image 10 using a mouse or the like. When, for example, the target object being presented on the captured image 10 or a periphery thereof has been dragged by a mouse or the like, the image processing device 2000 determines a direction of rotating the target object in accordance with a direction of the drag. For example, a rotation direction upon being dragged in a left direction is regarded as clockwise rotation, and a rotation direction upon being dragged in a right direction is regarded as counterclockwise rotation. Further, the image processing device 2000 determines an angle of rotation of the target object in accordance with a distance of the drag. In this case, a relation between a distance of a drag and an angle of rotation is previously defined. The image processing device 2000 rotates the target object on the basis of the determined direction and angle around a straight line (e.g. a straight line parallel to the z-axis), as a rotation axis, passing through the second position. The user disposes the depth-direction side of the target object along a line of the ground surface and compares the target object on the captured image 10 with the ground surface. The second position is not limited to an internal point of the target object and may be located externally.

Further, the presentation unit 2080 may accept an operation for moving a target object on the captured image 10. The user moves the target object on the captured image 10, for example, by an operation such as "dragging on the captured image 10 by the right button of a mouse." In this case, the input unit 2060 repeatedly acquires a position of a moving mouse pointer as the above-described first position. This acquisition is executed, for example, at a predetermined time interval. The presentation unit 2080 presents, in a first position on the captured image 10 newly acquired by the input unit 2060, the first image 40 newly generated on the basis of the first position, a fixedly obtained camera parameters, and height information of a second position. Further, the presentation unit 2080 deletes, from the captured image 10, the first image 40 having been presented in a first position acquired before the first position. By doing so, from a point of view of the user, the target object appears to be moving on a space appearing on the captured image 10.

Figure 13:
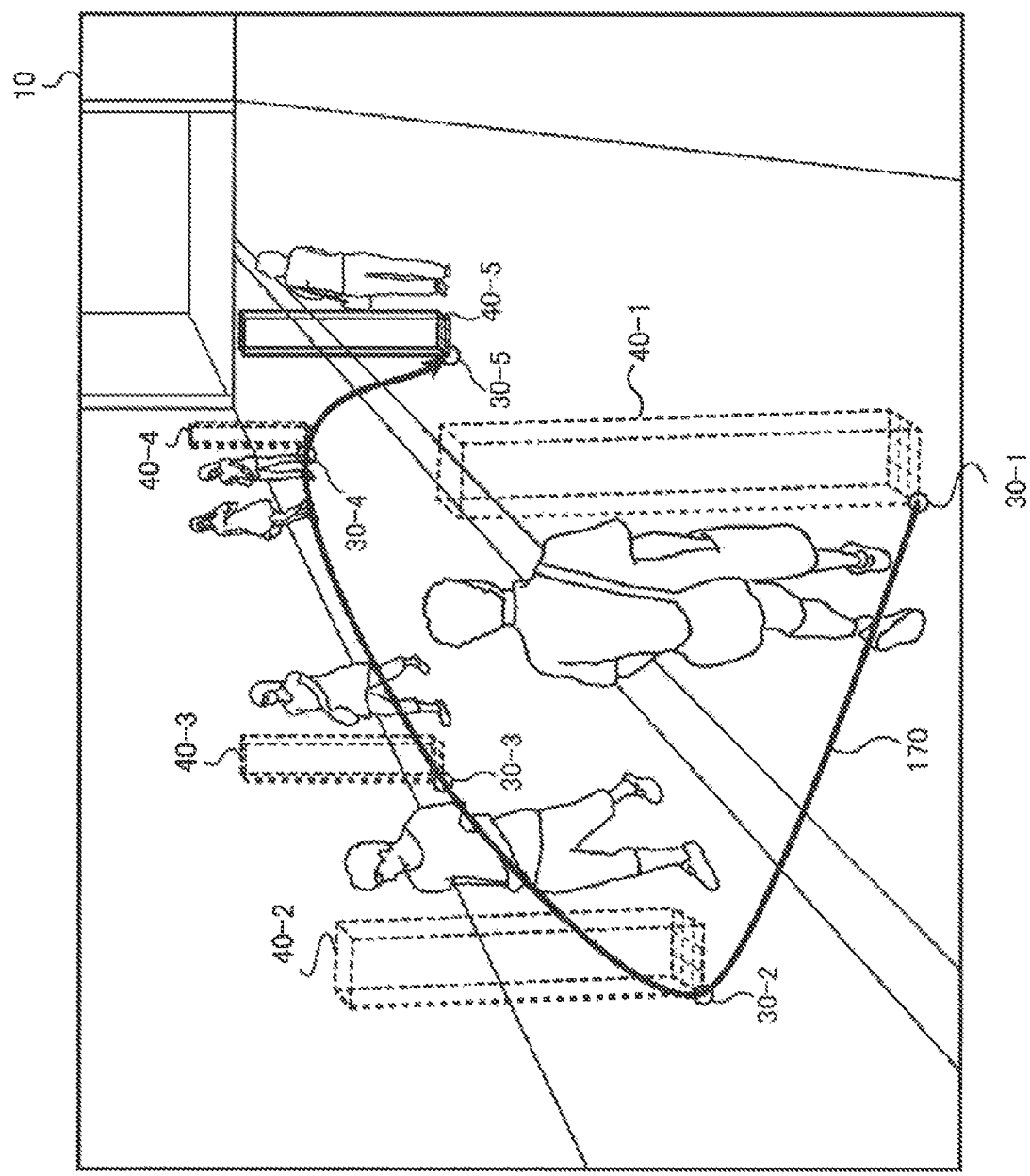
FIG. 13 is a diagram illustrating a situation where the user moves a target object on a captured image.

FIG. 13 is a diagram illustrating a situation where the user moves a target object on the captured image 10. In FIG. 13, a trajectory 170 indicates a trajectory in which the user has moved a target object. A first position 30-1 to a first position 30-5 indicate positions on the trajectory 170, respectively. A first image 40-1 to a first image 40-5 indicate first images 40 presented in the first position 30-1 to the first position 30-5, respectively. The first image 40 drawn with dotted lines indicates the first image 40 having already disappeared from the captured image 10, and the first image 40 drawn with solid lines indicates the first image 40 being currently presented. In FIG. 13, since a currently designated first position 30 is the first position 30-5, the first image 40-5 is being presented and the first image 40-1 to the first image 40-4 have disappeared.

As illustrated in FIG. 13, for example, the user moves a target object so as to pass through a transverse side of a person or the like appearing on the captured image 10 and thereby confirms whether there is no feeling of strangeness in a manner of view of the target object. In the case of FIG. 13, when there is no feeling of strangeness in a size and direction of the target object even upon moving the target object to a transverse side of any person, it is conceivable that camera parameters acquired by the parameter acquisition unit 2040 indicate a position and attitude approximate to a position and attitude of a camera having captured the captured image 10. When such a moving operation is provided, the user can easily verify, for various positions on the captured image 10, whether there is no feeling of strangeness in a manner of view of the target object. Specifically, when a manner of view of the target object is provided via continuous movement, rightfulness and a feeling of strangeness based on human visual sense is further emphasized, resulting in an effective function for verification.

Figure 14:
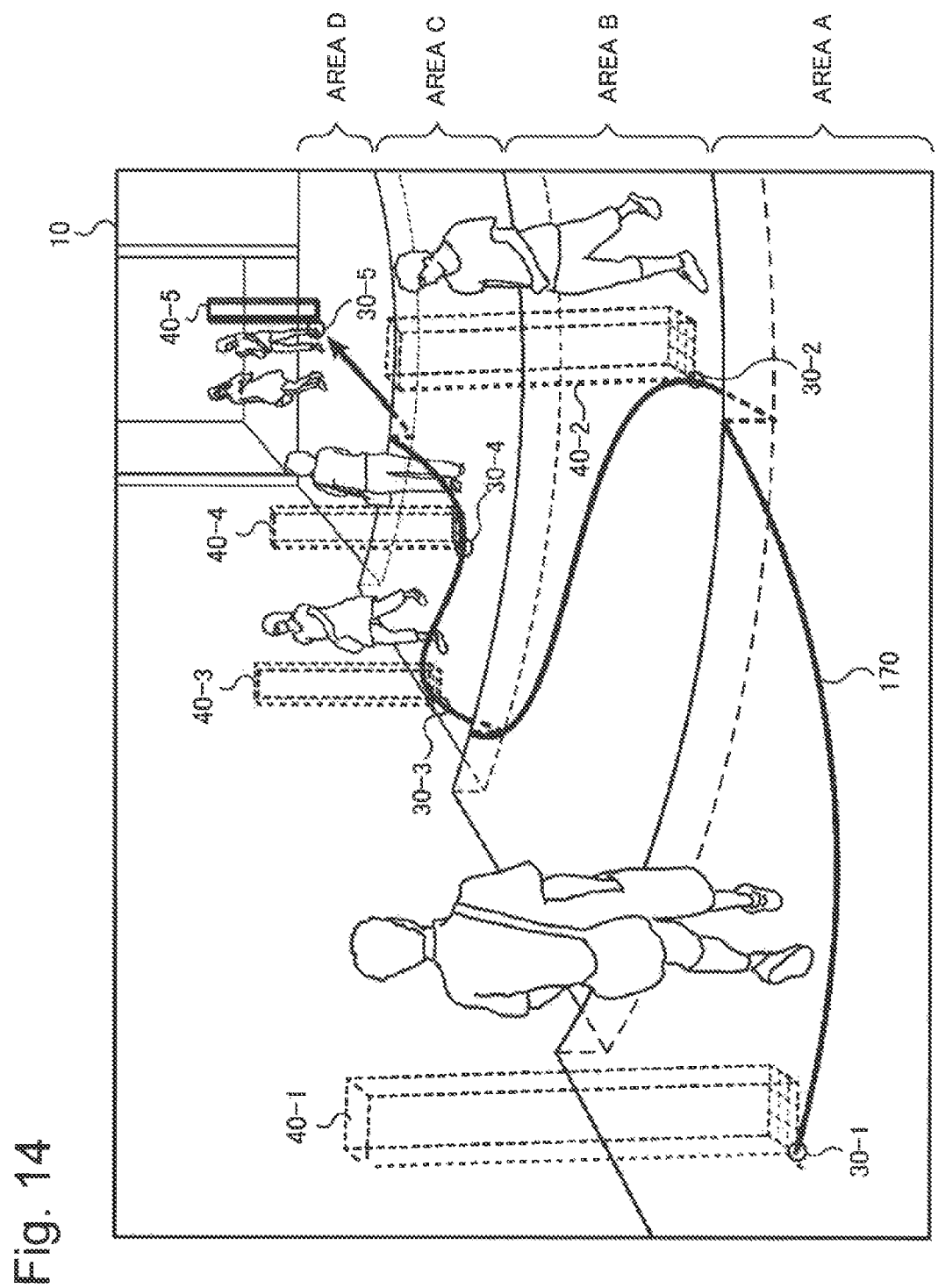
FIG. 14 is a diagram illustrating a situation where a target object is moved across a plurality of areas having different heights.

Further, as illustrated in FIG. 14, for example, in a captured image in which areas having a step as in stairs appear, height information may be set for each area having a step. In this case, as a trajectory is illustrated in FIG. 14, by moving a target object on an image, the user may easily verify whether there is no feeling of strangeness in a manner of view of the target object seamlessly including the steps.

Second Example Embodiment

Figure 7:
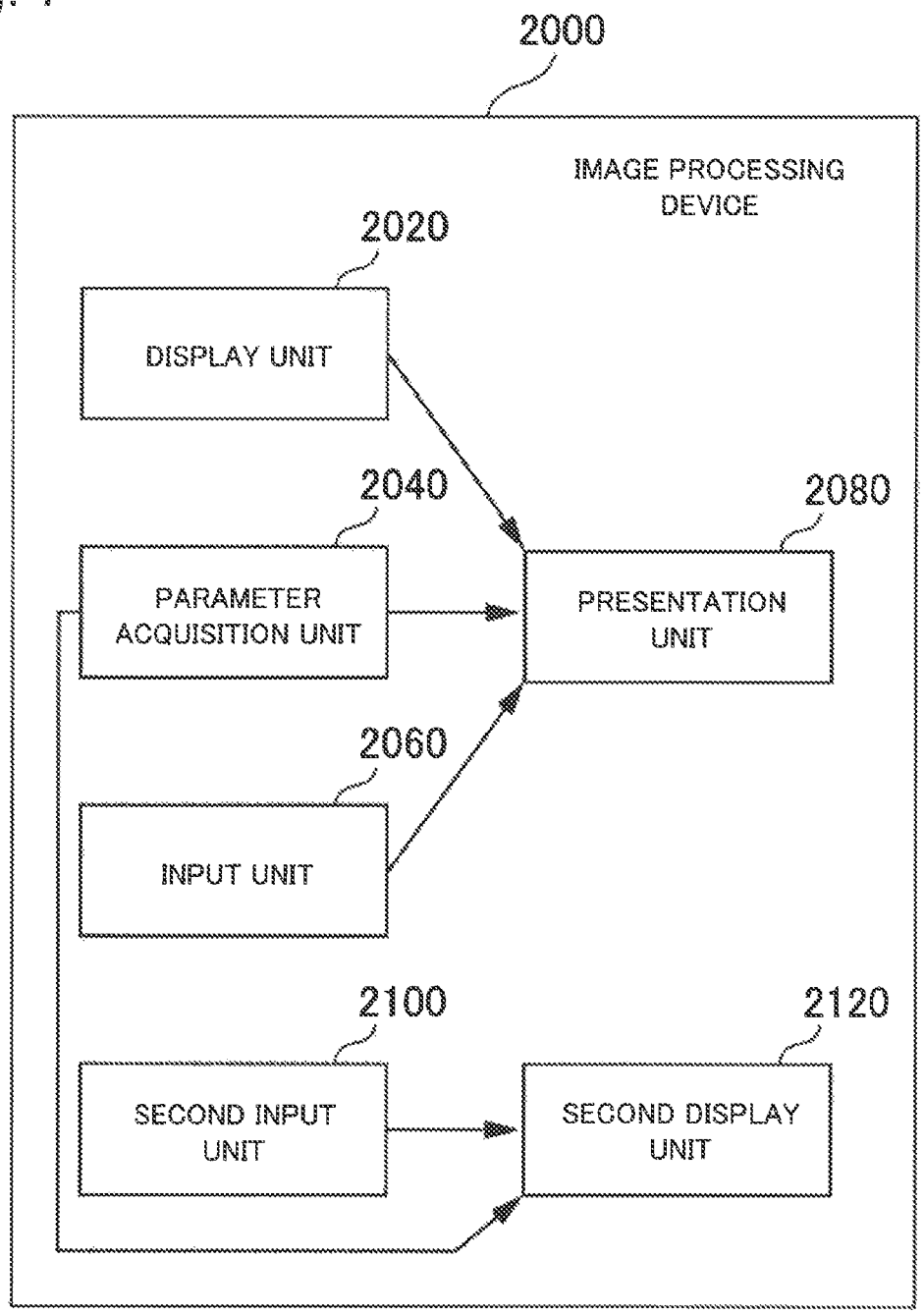
FIG. 7 is a block diagram illustrating an image processing device according to a second example embodiment.

FIG. 7 is a block diagram illustrating an image processing device 2000 according to a second example embodiment. In FIG. 7, an arrow indicates a flow of information. Further, in FIG. 7, each block does not represent a configuration of a hardware unit but represents a configuration of a function unit.

The image processing device 2000 of the second example embodiment includes a display unit 2020, a parameter acquisition unit 2040, a second input unit 2100, and a second display unit 2120. Functions included in the display unit 2020 and the parameter acquisition unit 2040 of the present example embodiment are the same as the functions included in the display unit 2020 and the parameter acquisition unit 2040 described in the first example embodiment, respectively.

The second input unit 2100 accepts inputting of a point or line to a captured image displayed by the display unit 2020. The second display unit 2120 displays, on the basis of camera parameters, a position on the captured image of the input point or line, and height information on a real space of the input point or line, an image indicating the point or line upon mapping on a plane parallel to a ground surface. In other words, the second display unit 2120 displays, when it is assumed that the input point or line within the captured image exists within a field of view of a camera having captured the captured image, an image in which the point or line assumed to exist within the field of view of the camera is mapped on the plane parallel to the ground surface. The second display unit 2120 may perform display for the same display as a display or the like on which a captured image is being displayed by the display unit 2020 or may perform display for a different display or the like.

The height information of the input point or line on the real space may be previously provided for the second display unit 2120 or may be input to the second input unit 2100 together with the point or line. When the height information on the real space of the input point or line is previously provided for the second display unit 2120, the height information is set as, for example, a height (e.g. height information (z-coordinate)=0) of a ground surface on the real space.

As described above, the second display unit 2120 maps a point or line existing on a captured image on a plane parallel to a ground surface in a real space. First, a mapping method of a point is described below. The second display unit 2120 transforms two-dimensional coordinates of a point on a captured image to three-dimensional coordinates on a real space. As described above, three-dimensional coordinates on the real space relating to two-dimensional coordinates on the captured image are not uniquely determined. Therefore, the second display unit 2120 uses height information of the input point. Specifically, it is assumed that the height information on the real space of the input point is given height information. Thereby, the second display unit 2120 may uniquely transform two-dimensional coordinates on the captured image to three-dimensional coordinates on the real space. A position of the input point on the plane parallel to the ground surface on the real space is represented by a width-direction coordinate and a depth-direction coordinate (the x-coordinate and the y-coordinate except the z-coordinate indicating height) of calculated three-dimensional coordinates.

As described in the first example embodiment, a technique for calculating, on the basis of camera parameters, two-dimensional coordinates of a point on a captured image, and height information on a real space of the point, three-dimensional coordinates on the real space relating to the two-dimensional coordinates is a known technique. Therefore, detailed description on this technique will be omitted.

A principle of processing of mapping a line input onto a captured image on a plane parallel to a ground surface in a real space is the same as the above-described principle of processing of mapping a point. The second display unit 2120 maps, for example, each of two or more points (e.g. points of both ends) existing on an input line on a plane parallel to a ground surface in a real space. The second display unit 2120 connects these mapped points with a line such as a straight line and the like. By doing so, the line input onto the captured image is mapped on the plane parallel to the ground surface in the real space.

Hereinafter, a utilization method of the image processing device 2000 of the second example embodiment will be described.

Figure 8:
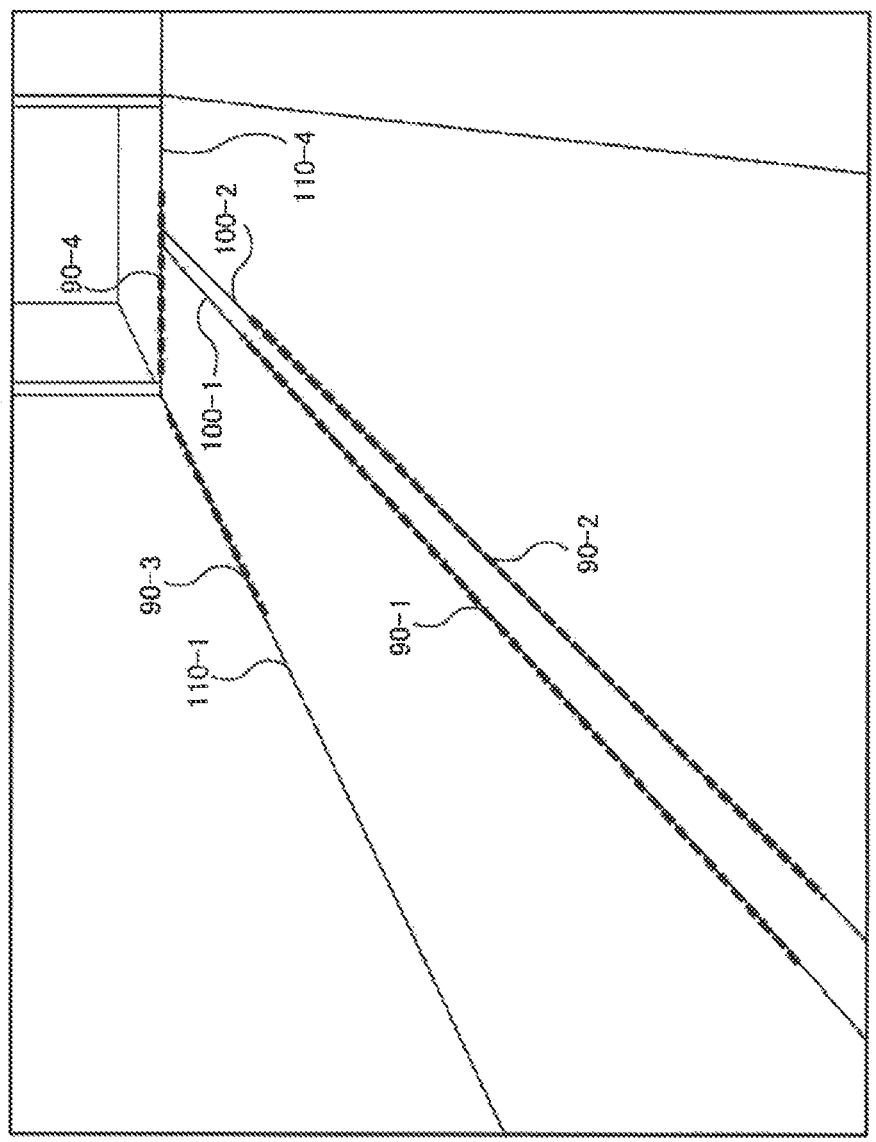
FIG. 8 is a diagram illustrating a captured image in which a line is input via a second input unit.

The user of the image processing device 2000 inputs, for example, a pattern in a real world and a line tracing a border between a wall and a ground surface to the second input unit 2100. FIG. 8 is a diagram illustrating a captured image 10 in which a line has been input via the second input unit 2100. A dotted line 90 represents a line input to the second input unit 2100. A pattern 100 is a line drawn on a ground surface on a real world appearing on a captured image. A pattern 100-1 and a pattern 100-2 are lines parallel to each other on the real world. A border 110 is a border between a wall and the ground surface on the real world appearing on the captured image. A border 110-1 and a border 110-2 vertically intersect with each other on the real world.

Figure 9A:
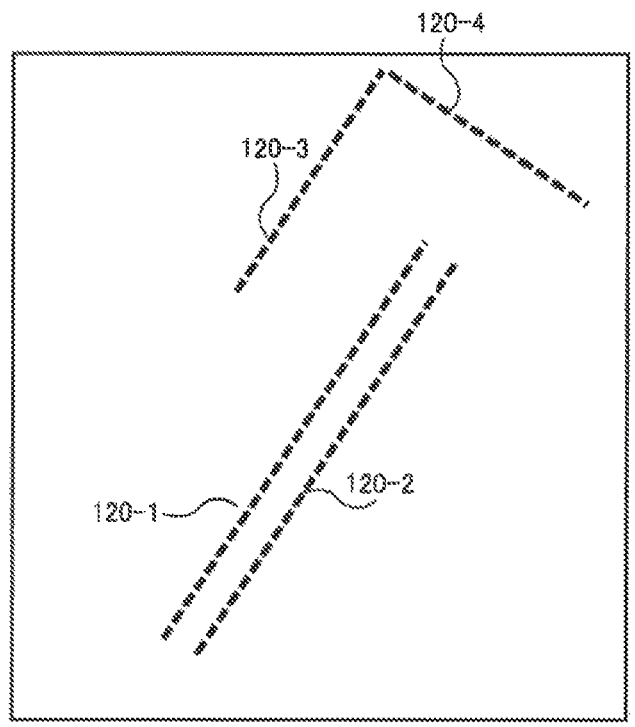
FIG. 9A is a diagram illustrating an image indicating a situation where a dotted line mapped on a plane representing a ground surface is viewed from a direction vertical to the plane.

The second display unit 2120 maps the dotted line 90 on a plane parallel to the ground surface. The second display unit 2120 displays a situation where the dotted line 90 mapped on the plane parallel to the ground surface is viewed from a direction vertical to the plane. FIGS. 9A and B show a diagram illustrating an image representing a situation where the dotted line 90 mapped on a plane representing a ground surface is viewed from a direction vertical to the plane. FIG. 9A is a diagram in which camera parameters indicate a position and attitude approximate to a position and attitude of a real camera. As described above, in a real world (in a place appearing on a captured image), the pattern 100-1 and the pattern 100-2 are lines drawn parallel to each other. Therefore, in FIG. 9A in which camera parameters indicate a position and attitude approximate to a position and attitude of a real camera, a projective line 120-1 in which a dotted line 90-1 is mapped on a plane representing a ground surface and a projective line 120-2 in which a dotted line 90-2 is mapped on the plane representing the ground surface are parallel or substantially parallel to each other. Further, as described above, in a real world (in a place appearing on a captured image), a border 110-3 and a border 110-4 vertically intersect with each other. Therefore, in FIG. 9A, a projective line 120-3 in which a dotted line 90-3 is mapped on the plane representing the ground surface and a projective line 120-4 in which a dotted line 90-4 is mapped on the plane representing the ground surface intersect with each other vertically or at a substantially vertical angle.

Figure 9B:
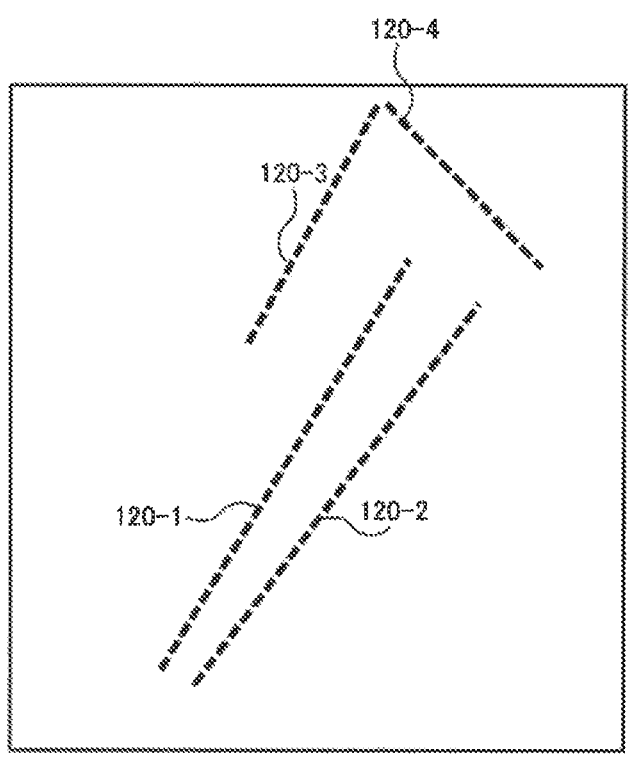
FIG. 9B is a diagram illustrating an image indicating a situation where a dotted line mapped on a plane representing a ground surface is viewed from a direction vertical to the plane.

On the other hand, FIG. 9B is a diagram in which camera parameters indicate a position and attitude different from a position and attitude of a real camera. In this case, the projective line 120-1 and the projective line 120-2 may not have a parallel or substantially parallel relation, or the projective line 120-3 and the projective line 120-4 may not have a vertical or substantially vertical relation.

In this manner, when the user using the captured image illustrated in FIG. 8 uses the pattern 100 and the border 110 in which a relation in a real world is known or easily predicted and views a result in which these are displayed by the second display unit 2120, the user may easily confirm whether camera parameters appropriately indicate a position and attitude of a real camera.

The method for using a pattern and the like on a ground surface is not limited to the above-described method. A method for inputting a plurality of points onto the pattern 100-1 and confirming whether the plurality of points are disposed on a straight line is conceivable, for example.

Figure 17A:
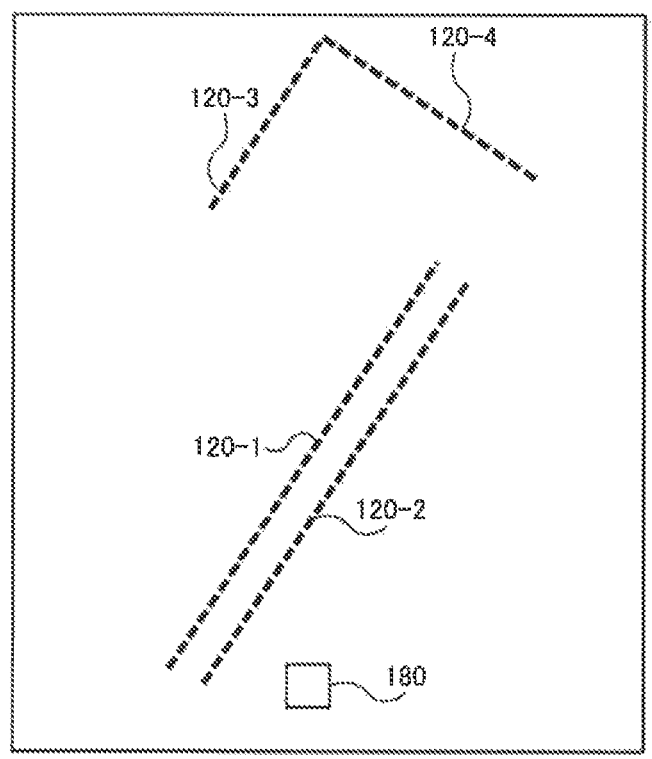
FIG. 17A is a diagram illustrating a projective line of a target object presented on a captured image on the plane representing the ground surface illustrated in FIG. 9A.
Figure 17B:
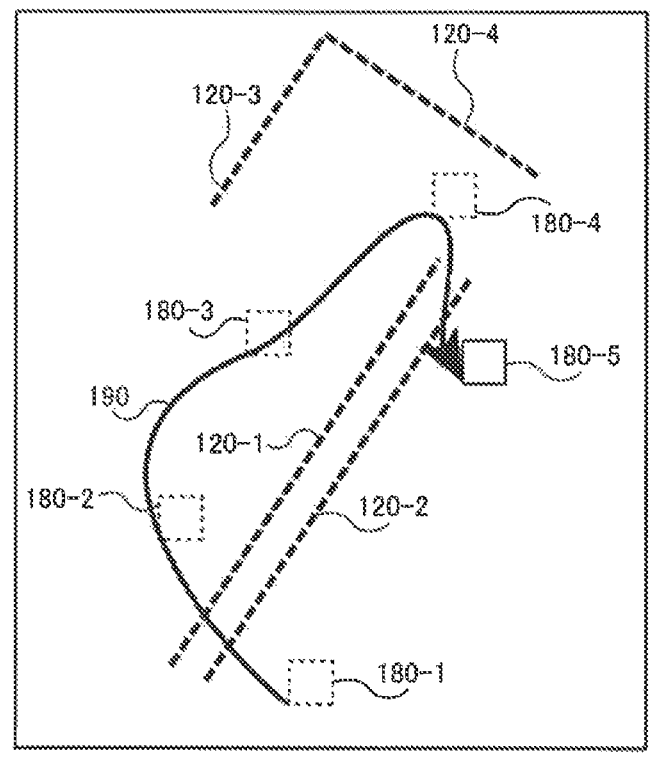
FIG. 17B is a diagram illustrating a projective line of a target object presented on a captured image on the plane representing the ground surface illustrated in FIG. 9A.

Further, the image processing device 2000 of the present example embodiment may map and present, on the plane, a target object being presented on a captured image in the first example embodiment. FIGS. 17A and 17B show a diagram illustrating a projective line 180 of a target object presented on a captured image on the plane representing the ground surface illustrated in FIG. 9A. FIG. 17A is a case in which the projective line 180 of the target object is presented when a first image indicating a still target object is presented on a captured image (e.g. FIG. 2B). On the other hand, FIG. 17B is a case in which the projective line 180 of the target object is moved in accordance with movement of the target object on a captured image when an operation for moving the target object is being executed (e.g. FIG. 13). A trajectory 190 represents a trajectory of movement of the projective line 180.

Further, when an object (a manhole or the like) in which an original shape is understandable appears on a ground surface of a captured image, a line tracing the shape may be input to the second input unit 2100. When camera parameters indicate a position and attitude approximate to a position and attitude of a real camera, a shape of a line displayed by the second display unit 2120 represents a shape close to an original shape of a traced object. When, for example, a line is input so as to trace a manhole appearing on a captured image, a shape of the line displayed by the second display unit 2120 becomes a perfect circle or a shape close to a perfect circle. On the other hand, when camera parameters indicate a position and attitude different from a position and attitude of a real camera, a shape of a line presented by the second display unit 2120 becomes a shape (e.g. an elliptical shape) different from a perfect circle.

Figure 10:
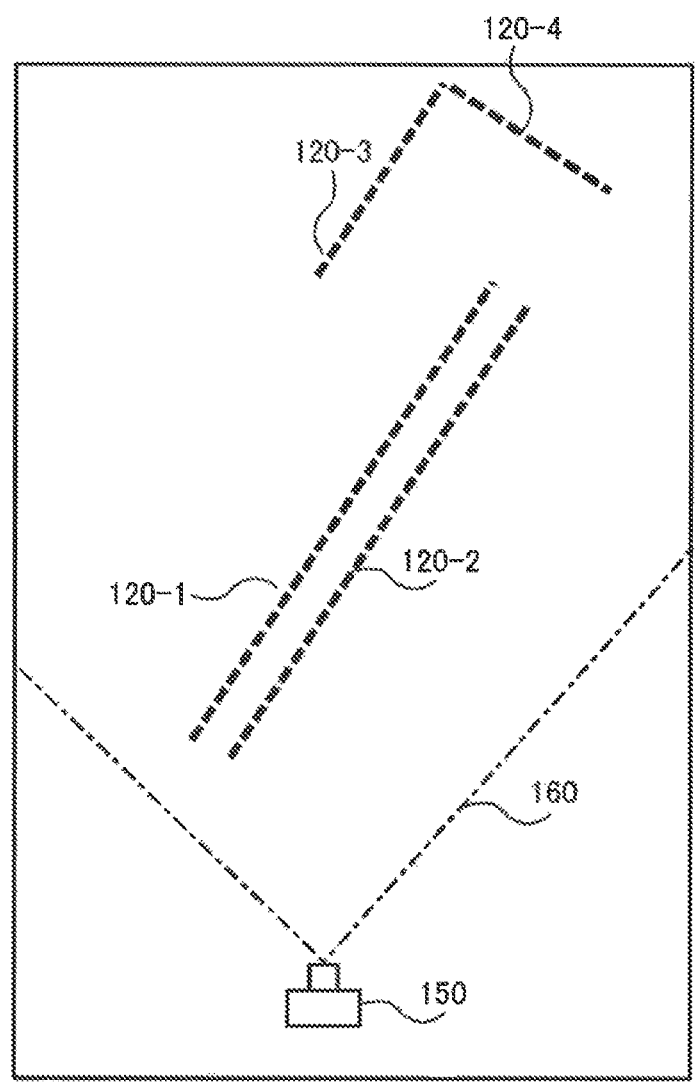
FIG. 10 is a diagram illustrating an image in which a position and a field of view of a camera have been presented together with a projective line illustrated in FIG. 9A.

Further, the second display unit 2120 may present a position and a field of view of a camera on an image, together with a point and a line mapped on a plane parallel to a ground surface. FIG. 10 is a diagram illustrating an image in which a position and a field of view of a camera are presented, together with the projective lines illustrated in FIG. 9(a). In FIG. 10, a camera position 150 represents a position of the camera, and a field of view 160 represents a field of view of the camera.

A system setter or the like handling the image processing device 2000 of the second example embodiment views a position relation of a point and a line mapped on a plane parallel to a ground surface and thereby confirms whether camera parameters appropriately indicate a position and attitude or the like of a real camera. As illustrated in FIG. 10, when a position and a field of view of a camera are presented together with a point and a line mapped on a plane parallel to a ground surface, the system setter or the like may further grasp a position relation between the mapped point and line and the position and the field of view of the camera. Therefore, the system setter or the like may more easily and accurately confirm whether the camera parameters appropriately indicate the position and attitude or the like of the real camera.

<Flow of Processing>

Figure 11:
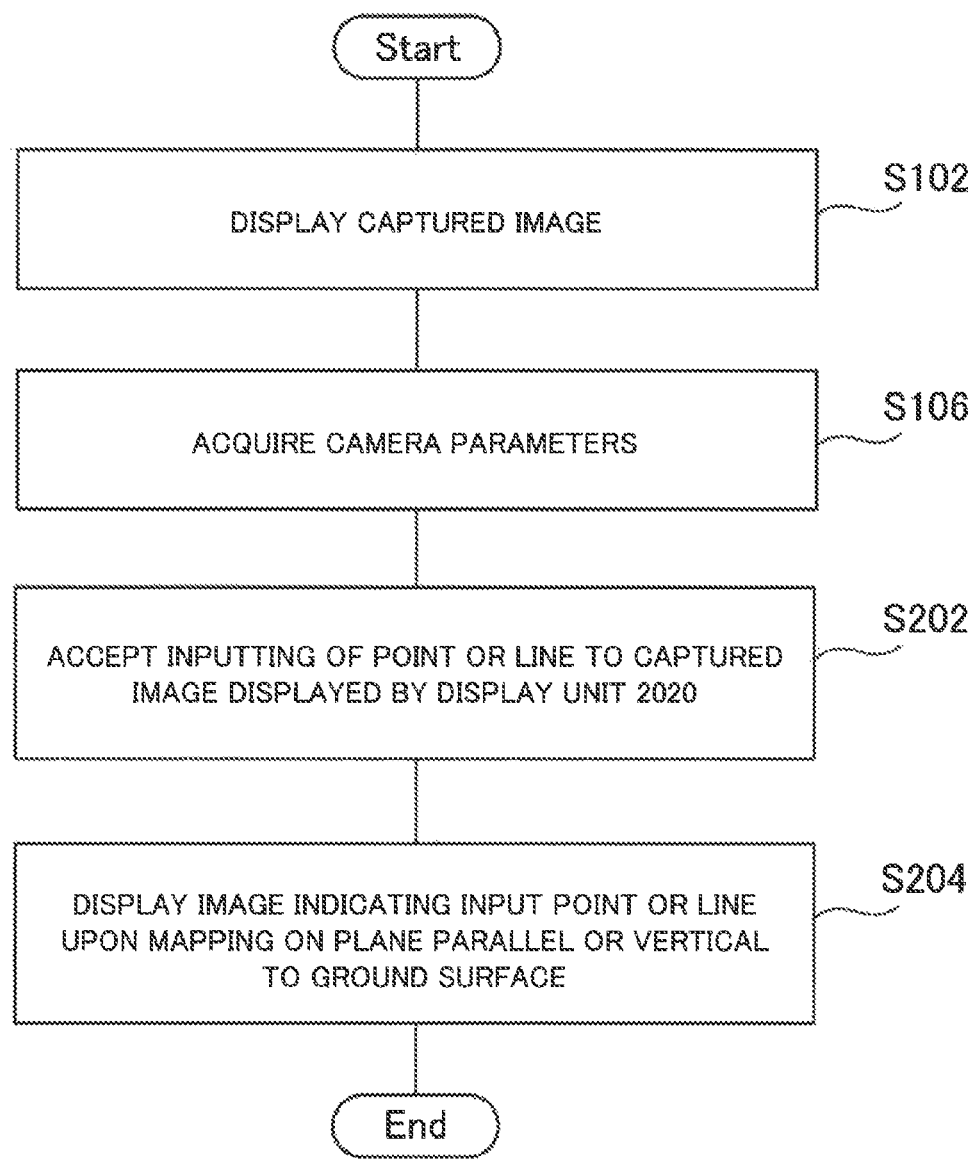
FIG. 11 is a flowchart illustrating a flow of processing executed by the image processing device of the second example embodiment.

FIG. 11 is a flowchart illustrating a flow of processing executed by the image processing device 2000 of the second example embodiment. Processing executed in steps S102 and S106 is the same as the processing executed in steps S102 and S106 of FIG. 3. In step S202, the second input unit 2100 accepts inputting of a point or line to a captured image displayed by the display unit 2020. In step S204, the second display unit 2120 displays an image indicating the point or line upon mapping on a plane parallel to a ground surface.

<Operations and Advantageous Effects>

According to the image processing device 2000 of the present example embodiment, the user inputs a line or the like that easily specifies an original shape or a position relation to a captured image and checks whether a line or the like displayed by the second display unit 2120 satisfies the original shape or the position relation, and thereby may easily confirm whether camera parameters appropriately indicate a position and attitude or the like of a real camera.

Third Example Embodiment

Figure 15:
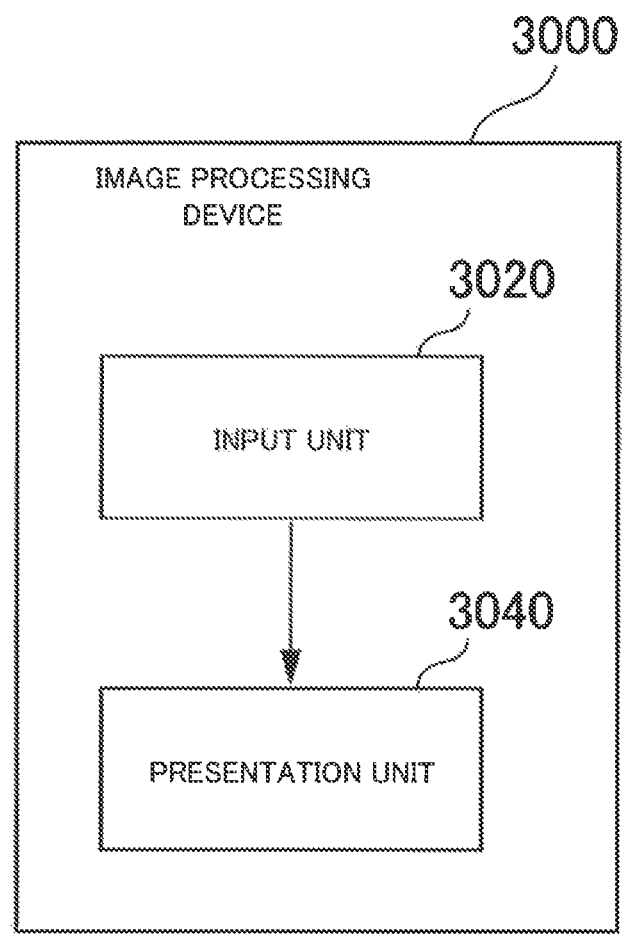
FIG. 15 is a block diagram illustrating an image processing device according to a third example embodiment.

FIG. 15 is a block diagram illustrating an image processing device 3000 according to a third example embodiment. In FIG. 15, an arrow indicates a flow of information. Further, in FIG. 15, each block does not represent a configuration of a hardware unit but represents a configuration of a function unit.

The image processing device 3000 of the third example embodiment includes an input unit 3020 and a presentation unit 3040. The input unit 3020 accepts inputting of an operation for moving a first image being presented on a captured image captured by a camera. The first image is an image in which a target object having a predetermined shape and a predetermined size on a real space is superimposed on the captured image on the basis of predetermined camera parameters indicating a position and attitude of the camera. When, for example, a position on the captured image in which the first image is being presented is designated as a position A, the first image is equivalent to a first image presented by the presentation unit 2080 upon designating the position A as a first position in the image processing device 2000 of the first example embodiment. A target object in the third example embodiment is the same as the target object described in the first example embodiment. Further, predetermined camera parameters in the third example embodiment is the same as the camera parameters described in the first example embodiment.

The presentation unit 3040 presents, on the basis of the camera parameters, a first image indicating a target object in a manner of view relating to a position on the captured image after the movement. A method in which the presentation unit 3040 presents a first image relating to a target object to be moved is the same as "the method in which the presentation unit 2080 presents the first image 40 relating to a target object to be moved on the captured image 10" described in the first example embodiment.

A hardware configuration of the image processing device 3000 is the same as the hardware configuration of the image processing device 2000.

<Flow of Processing>

Figure 16:
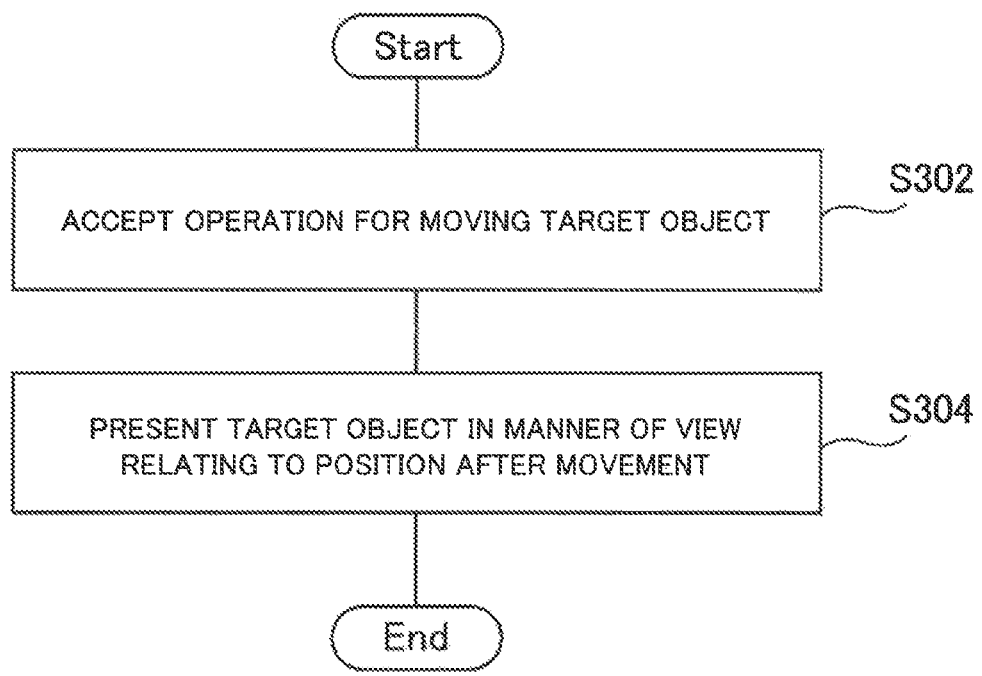
FIG. 16 is a flowchart illustrating a flow of processing executed by the image processing device of the third example embodiment.

FIG. 16 is a flowchart illustrating a flow of processing executed by the image processing device 3000 of the third example embodiment. In step S302, the input unit 3020 accepts inputting of an operation for movement to a first image superimposed on a captured image. In step S304, the presentation unit 3040 presents, on the basis of camera parameters, the first image indicating the target object in a manner of view relating to a position on the captured image after the movement.

The flow of processing illustrated in FIG. 16 is one example, and a flow of processing executed by the image processing device 3000 is not limited to the flow illustrated in FIG. 16.

<Operations and Advantageous Effects>

According to the present example embodiment, as illustrated, for example, in FIG. 13 or FIG. 14, the user moves a target object so as to pass through a transverse side of a person or the like appearing on the captured image 10 and thereby may easily confirm whether there is no feeling of strangeness in a manner of view of the target object. Specifically, when a manner of view of a target object is provided via continuous movement, rightfulness and a feeling of strangeness based on human visual sense are further emphasized, resulting in an effective function for verification.

Modified Examples

The image processing device 2000 may include functions as described below. The image processing device 2000 including the following functions is expressed as an image processing device 2000 of a first modified example. The image processing device 2000 of the first modified example may include the functions of the image processing device 2000 of the above-described first and second example embodiments or may not include these functions.

As describe above, for estimation of camera parameters, used is a method in which "a calibration pattern or an object equivalent thereto is image-captured by a camera, and estimation is performed on the basis of an association relation between three-dimensional coordinates of the calibration pattern in a real world and two-dimensional coordinates of the calibration pattern of the captured image" (NPL 1). Specifically, camera parameters are calculated so as to reduce, using estimated camera parameters, an error (reprojection error) between two-dimensional coordinates upon projecting three-dimensional coordinates of a calibration pattern in a real world on a captured image and two-dimensional coordinates of the calibration pattern appearing on the captured image. There is, for example, a method for calculating estimation values of camera parameters so as to minimize a square sum of errors.

Commonly, when a system setter or the like handling the image processing device 2000 performs work for estimating camera parameters using the above-described calibration, the system setter or the like views only camera parameters as an estimation result and does not view the error that is an interim progress. However, when the error that is an interim progress is caused to be viewed by the system setter or the like, it is conceivable that accuracy in estimation of camera parameters may be enhanced. When, for example, positions having large errors are concentrated on an edge of a captured image, it is conceivable that an error is increased due to a cause resulting from an input error of a corresponding point or lens distortion. In such a case, when a selection manner of a calibration pattern is changed so as not to use a calibration pattern image-captured in a position within a predetermined distance from an edge of an image to estimate camera parameters, accuracy of the camera parameters may be enhanced.

Figure 12:
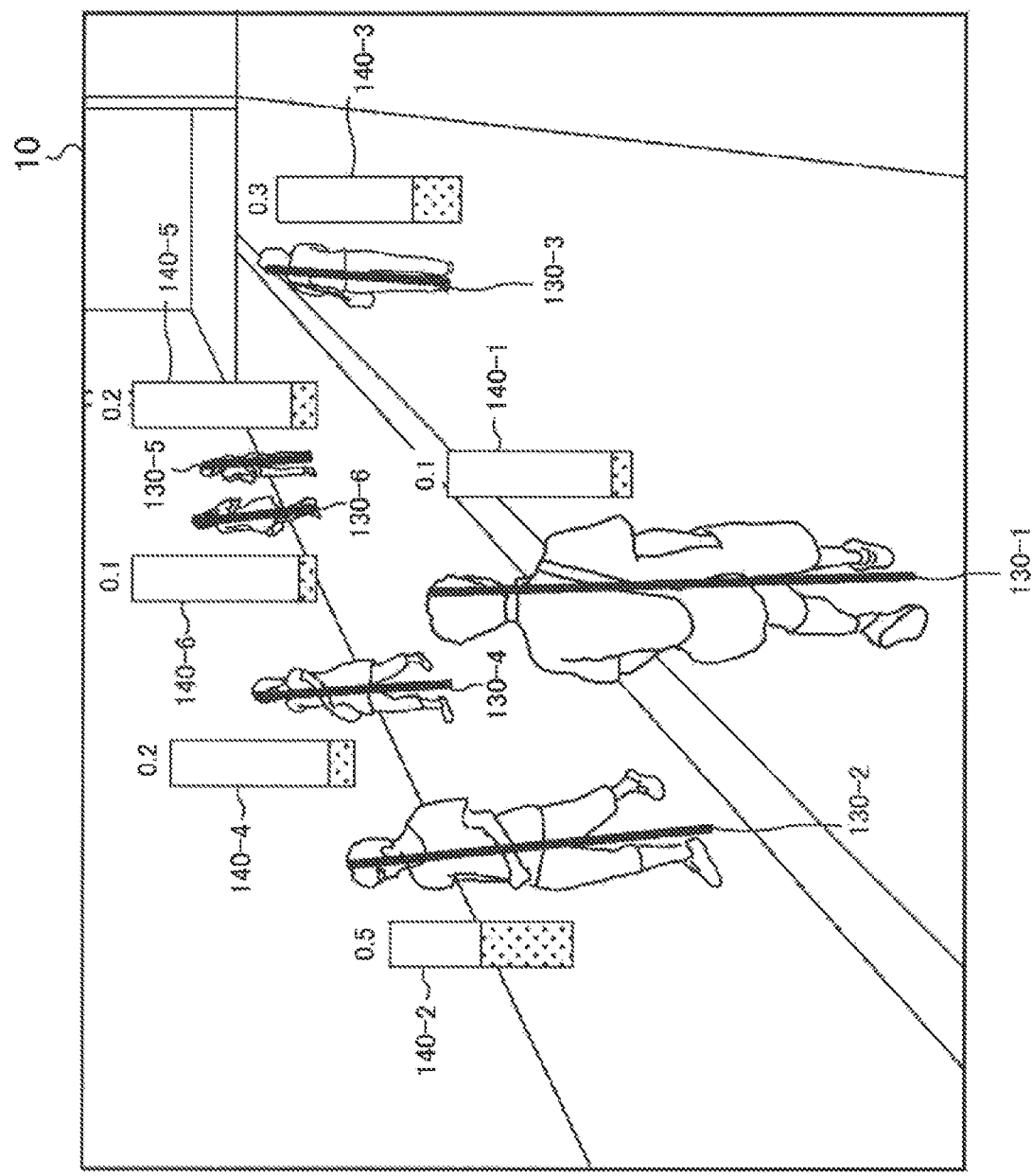
FIG. 12 is a diagram illustrating a situation where error information is presented on a captured image.

The image processing device 2000 presents, for each position where a calibration pattern is image-captured, the error with respect to the calibration pattern image-captured in the position in a periphery of a position on a captured image relating to the position. FIG. 12 is a diagram illustrating a situation where information (error information 140) indicating an error is presented on a captured image. In FIG. 12, to obtain a calibration pattern, a person is used. Specifically, a line 130 connecting the feet and the head of a person substantially standing erect is used as a calibration pattern. The error information 140 presented in a transverse side of the line 130 indicates a re-projection error relating to the line 130.

The image processing device 2000 may map the calibration pattern on a ground surface on the basis of the technique described in the second example embodiment and display the error in association with the calibration pattern mapped on the ground surface.

While the example embodiments of the present invention have been described with reference to the drawings, these example embodiments are illustrative of the present invention, and various constitutions other than the above are employable.

Hereinafter, examples of reference modes will be supplementarily noted.

1. An image processing device includes:
    an input means configured to accept inputting of an operation for movement, on a captured image captured by a camera, to a first image that is superimposed on the captured image on the basis of predetermined camera parameters indicating a position and attitude of the camera and indicates a target object having a predetermined shape and a predetermined size set on a real space; and
    a presentation means configured to present the first image indicating the target object in a manner of view relating to a position on the captured image after the movement on the basis of the camera parameters.
2. The image processing device according to 1, wherein
    the input means accepts an operation for the movement by repeatedly accepting a designation of a first position on the captured image, and
    the presentation means generates, when a certain first position is designated, on the basis of the camera parameters, a predetermined shape and a predetermined size on a real space of the target object, and a second position on the real space relating to the first position, a first image indicating the target object on the captured image appearing in a camera determined by the camera parameters when the target object is disposed in the second position and presents the generated first image in the first position on the captured image.
3. The image processing device according to 2, wherein
    the presentation means
    acquires height information of the second position and calculates the second position on the basis of the camera parameters, the first position, and the height information of the second position.
4. The image processing device according to 3, wherein the presentation means acquires information indicating a height of a ground surface in a real space as the height information of the second position.
5. The image processing device according to 3, wherein the presentation means acquires pieces of information of different heights for a plurality of areas on the captured image, respectively, as the height information of the second position.
6. The image processing device according to any one of 1 to 5, wherein the target object has a planar shape.
7. The image processing device according to any one of 1 to 6, comprising:
    a second input means configured to accept inputting of a point or line to the captured image; and
    a second display means configured to display a second image indicating the point or line upon mapping on a plane parallel to a ground surface, on the basis of the camera parameters, a position on the captured image of the point or line, and height information on a real space of the point or line.
8. An image processing device includes:
    an input means configured to accept a designation of a first position on a captured image; and
    a presentation means configured to present, on the basis of predetermined camera parameters indicating a position and attitude of a camera, a predetermined shape and a predetermined size on a real space of a target object, and a second position on the real space relating to the first position, a first image indicating the target object on the captured image appearing in a camera determined by the camera parameters when the target object is disposed in the second position in the first position on the captured image.
9. The image processing device according to 8, wherein
    the input means accepts designations of a plurality of first positions, and
    the presentation means presents first images indicating a plurality of target objects relating to the plurality of first positions in respective corresponding first positions on the captured image.
10. The image processing device according to 8 or 9, wherein
    the input means repeatedly accepts a designation of the first position, and
    the presentation means generates, when a certain first position is designated, a first image indicating the target object disposed in a second position on a real space relating to the first position and presents the generated first image in the first position on the captured image.
11. An image processing device comprising:
    an input means configured to accept inputting of a point or line to a captured image captured by a camera; and
    a display means configured to display a first image indicating the point or line upon mapping on a plane parallel to a ground surface, on the basis of predetermined camera parameters indicating a position and attitude of the camera, a position on the captured image of the point or line, and height information on a real space of the point or line.
12. An image processing method executed by a computer, the method comprising:
    an input step of accepting inputting of an operation for movement, on a captured image captured by a camera, to a first image that is superimposed on the captured image on the basis of predetermined camera parameters indicating a position and attitude of the camera and indicates a target object having a predetermined shape and a predetermined size set on a real space; and a presentation step of presenting the first image indicating the target object in a manner of view relating to a position on the captured image after the movement on the basis of the camera parameters.

13. The image processing method according to 12, wherein
the input step accepts an operation for the movement by repeatedly accepting a designation of a first position on the captured image, and
the presentation step generates, when a certain first position is designated, on the basis of the camera parameters, a predetermined shape and a predetermined size on a real space of the target object, and a second position on the real space relating to the first position, a first image indicating the target object on the captured image appearing in a camera determined by the camera parameters when the target object is disposed in the second position and presents the generated first image in the first position on the captured image.

14. The image processing method according to 13, wherein
the presentation step
acquires height information of the second position and
calculates the second position on the basis of the camera parameters, the first position, and the height information of the second position.

15. The image processing method according to 14, wherein the presentation step acquires information indicating a height of a ground surface in a real space as the height information of the second position.

16. The image processing method according to 14, wherein the presentation step acquires pieces of information of different heights for a plurality of areas on the captured image, respectively, as the height information of the second position.

17. The image processing method according to any one of 12 to 16, wherein the target object has a planar shape.

18. The image processing method according to any one of 12 to 17, including:
a second input step of accepting inputting of a point or line to the captured image, and
a second display step of displaying a second image indicating the point or line upon mapping on a plane parallel to a ground surface, on the basis of the camera parameters, a position on the captured image of the point or line, and height information on a real space of the point or line.

19. An image processing method executed by a computer, the method comprising:
an input step of accepting a designation of a first position on a captured image; and
a presentation step of presenting, on the basis of predetermined camera parameters indicating a position and attitude of a camera, a predetermined shape and a predetermined size on a real space of a target object, and a second position on the real space relating to the first position, a first image indicating the target object on the captured image appearing in the camera determined by the camera parameters when the target object is disposed in the second position in the first position on the captured image.

20. The image processing method according to 19, wherein
the input step accepts designations of a plurality of first positions, and
the presentation step presents first images indicating a plurality of target objects relating to the plurality of first positions in respective corresponding first positions on the captured image.

21. The image processing method according to 19 or 20, wherein
the input step repeatedly accepts a designation of the first position, and the presentation step generates, when a certain first position is designated, a first image indicating the target object disposed in a second position on a real space relating to the first position and presents the generated first image in the first position on the captured image.

22. An image processing method executed by a computer, the method comprising:
an input step of accepting inputting of a point or line to a captured image captured by a camera; and
a display step of displaying a first image indicating the point or line upon mapping on a plane parallel to a ground surface, on the basis of predetermined camera parameters indicating a position and attitude of the camera, a position on the captured image of the point or line, and height information on a real space of the point or line.

23. A program that causes a computer to operate as the image processing device according to any one of 1 to 11.

This application is based upon and claims the benefit of priority from Japanese patent application No. 2014-191480, filed on Sep. 19, 2014 and Japanese patent application No. 2014-257137, filed on Dec. 19, 2014, the disclosures of which are incorporated herein in their entirety by reference.

The invention claimed is:

1. An image processing device comprising:
one or more memories storing instructions; and
one or more processors configured to execute the instructions to:
accept inputting of an operation for movement of a target object on a captured image, the captured image including at least one of a plurality of persons and a plurality of objects captured by a camera, the target object being indicated by a first image that is superimposed on the captured image based on specific camera parameters relating to a position and an attitude of the camera set on a real space; and
present, based on the specific camera parameters, a trajectory of the target object on the captured image, the trajectory corresponding to the movement of the target object on the captured image and passing through at least one position on the captured image, the at least one position relating to the at least one of the plurality of persons and the plurality of objects, wherein the one or more processors are further configured to:
accept the operation for movement by repeatedly accepting a designation of a first position on the captured image,
generate, when the first position is designated, based on the specific camera parameters, a predetermined shape and a predetermined size on a real space of the target object, and a second position on the real space relating to the first position, the first image indicating the target object on the captured image appearing in a camera determined by the specific camera parameters when the target object is disposed in the second position, and
present the generated first image in the first position on the captured image.

2. The image processing device according to claim 1, wherein
the one or more processors are further configured to:
acquire height information of the second position, and
calculate the second position based on the specific camera parameters, the first position, and the height information of the second position.

3. The image processing device according to claim 2, wherein the one or more processors are further configured to acquire information indicating a height of a ground surface in a real space as the height information of the second position.

4. The image processing device according to claim 2, wherein the one or more processors are further configured to acquire pieces of information of different heights for a plurality of areas on the captured image, respectively, as the height information of the second position.

5. The image processing device according to claim 1, wherein the target object has a planar shape.

6. The image processing device according to claim 1, wherein:
   the one or more processors are further configured to:
      accept inputting of a point or a line to the captured image; and
      display a second image indicating the point or the line upon mapping on a plane parallel to a ground surface, based on the specific camera parameters, a position on the captured image of the point or the line, and height information on a real space of the point or the line.

7. The image processing device according to claim 1, wherein the target object is a virtual cubic.

8. The image processing device according to claim 1, wherein the target object has a simplified shape and/or size representing the at least one of the plurality of persons and the plurality of objects.

\* \* \* \* \*